(12) United States Patent
Fujimura

(10) Patent No.: US 7,762,421 B2
(45) Date of Patent: Jul. 27, 2010

(54) EASY-OPEN SEALED CONTAINER

(75) Inventor: Kaoru Fujimura, Tokyo (JP)

(73) Assignee: Fujimura Kogyo Co., Ltd., Tokyo (JP)

( * ) Notice: Subject to any disclaimer, the term of this patent is extended or adjusted under 35 U.S.C. 154(b) by 178 days.

(21) Appl. No.: 11/988,914

(22) PCT Filed: Aug. 7, 2006

(86) PCT No.: PCT/JP2006/315979

§ 371 (c)(1),
(2), (4) Date: Jan. 15, 2008

(87) PCT Pub. No.: WO2007/018300

PCT Pub. Date: Feb. 15, 2007

(65) Prior Publication Data

US 2009/0250466 A1    Oct. 8, 2009

(30) Foreign Application Priority Data

Aug. 9, 2005  (JP) ............................ 2005-231389
Jul. 13, 2006 (WO) ................ PCT/JP2006/314334

(51) Int. Cl.
*B65D 41/00*   (2006.01)
*B65D 51/20*   (2006.01)
*B65D 17/34*   (2006.01)
*B65D 17/40*   (2006.01)
*B65D 55/02*   (2006.01)
*B65D 39/00*   (2006.01)
*B65D 43/00*   (2006.01)
*B65D 47/00*   (2006.01)
*B65D 51/00*   (2006.01)

(52) U.S. Cl. ................. 220/359.1; 220/257.2; 220/270; 220/276; 215/204; 215/232; 215/254; 215/256

(58) Field of Classification Search ............. 220/359.1, 220/359.2, 359.3, 257.2, 258.5, 266, 270, 220/276, 257.1, 258.3; 215/204, 232, 251, 215/254
See application file for complete search history.

(56) References Cited

U.S. PATENT DOCUMENTS 3,495,759 A * 2/1970 Bergstrom et al. .......... 220/270
4,969,570 A * 11/1990 Harvey, Sr. ................. 220/733
5,115,934 A * 5/1992 Nelson ....................... 220/276
5,772,623 A * 6/1998 Conte .......................... 602/57

* cited by examiner

*Primary Examiner*—Anthony Stashick
*Assistant Examiner*—Andrew T Kirsch
(74) *Attorney, Agent, or Firm*—Flynn, Thiel, Boutell & Tanis, P.C.

(57) ABSTRACT

An easy-open sealed container satisfying requests of perfectivity of sealing and readiness of unsealing is provided. The container includes a plastic pack container, a flange portion surrounding an opening of the plastic pack container, a seal film bonded onto an upper surface of the flange portion to thereby seal the pack container, and a peeling film bonded onto a lower surface of the flange portion. The flange portion includes a broken portion including a cut-off line and a connection part formed in a part or a whole of the flange portion. The peeling film includes a peeling-start portion extruding outward or inward of the flange portion.

14 Claims, 32 Drawing Sheets

EASY-OPEN SEALED CONTAINER

FIELD OF THE INVENTION

The present invention relates to an easy-open sealed container in which a seal film is bonded on the upper surface of a flange portion which surrounds an opening portion of a plastic pack container to thereby seal the pack container.

BACKGROUND OF THE INVENTION

A tofu pack is sealed by putting tofu into a plastic pack container and bonding a plastic film onto the pack container, wherein bonding is completely performed due to the nature of the goods. Therefore, since it is very difficult to peel off the bonded portion of the film by hand, the tofu pack tops the package which is most difficult to open. Though the tofu is heavy and easy to get out of shape, the tofu pack, while it is put in a show case, even if it is carelessly handled, the pack is not damaged and does not lose its sealing function. However, when the tofu pack is opened, it is necessary to cut and open the film with a knife or a kitchen knife. Though a container which satisfies the requirements for perfect sealing and readiness of unsealing that are in conflict with each other is best, a container satisfying such requirements has not yet been achieved.

Technology of filling and packing the contents has been disclosed in, for example, JP-A-10-119936. Herein, a peeling portion which is bondless to a lid material is partially formed in a base material, and the peeling portion is pinched with fingertips to open the pack. This peeling portion provides a start of unsealing. However, even in case that the bondless peeling portion is provided at the corner of the pack container, it is difficult to think that unsealing of the tofu pack in which the film is completely bonded is facilitated. This is because the tofu pack cannot be held forcibly since the material of the container is soft. Further, a package container which holds pickled vegetables including pickle, which has been disclosed in JP-A-2002-211647, has a constitution in which a label that covers an opening and closing door adheres onto a surface of a lid body in order to obtain sufficient airtightness and make unsealing of the container easy. However, in this case, the pickle may leak from the opening and closing door surrounded by notches, and it is also difficult to take out the tofu without getting out of its shape because the opening and closing door is considerably smaller than the container body.

Therefore, this inventor has developed a sealed container with a snap portion (JP-A-2006-21791) in which a flange portion surrounding an opening portion of a pack container is firstly snapped thereby to take out the contents readily without peeling off a film at a firmly sealed portion. In this invention, a snap groove is formed in order to snap the flange portion. However, because of structure in which the groove portion exists, there is possibility that the flange portion will bend when a container maker forwards goods. Further, since there is also possibility that the flange portion will bend in a food packing process during the display at the shop, it is necessary to pay attention to handling of the container. Even if the flange portion snaps at the groove portion, there is no anxiety that the contents will leak out. However, the fact that the flange portion has been bent causes a sense of unease. Further, in order to snap the flange portion, it is necessary to bend the flange portion completely from end to end and at about 180°. However, even if this is explained, it can be difficult for the user to understand. In case that there is difficulty in unsealing, there is also possibility that the container will break and the contents leak out from the unexpected portion. Further, there is room for such improvement in that the flange portion cannot be snapped when occasion demands.

SUMMARY OF THE INVENTION

In view of the above circumstances, an object of the invention is to enable unsealing of a sealed container surely and readily. Further, another object of the invention is to provide an easy-open sealed container which can satisfy the requirements for perfect sealing and readiness of unsealing that are in conflict with each other.

In order to solve the above problems, a sealed container of the invention having the constitution in which a seal film is bonded onto the upper surface of a flange portion surrounding an opening portion of a plastic pack container to thereby seal the above opening portion incorporates the following means: a broken portion including a cut-off line and a connection part is formed in a part or the whole of the flange portion, whereby the flange portion can separate into an inner portion near the opening portion and an outer portion near the peripheral edge; a peeling film is bonded onto the lower surface of the flange portion in which the broken portion is formed; a peeling-start portion extruding outward or inward of the flange portion is provided in a part of the peeling film; by peeling off the peeling film along the flange portion, the broken portion which separates the flange portion into the inner and outer portions can be exposed; and with respect to the seal film and the peeling film bonded onto the upper and lower surfaces of the flange portion, bonding power of the seal film for the flange portion located outside of the broken portion is made highest.

The sealed container according to the invention has the constitution in which the seal film which covers the opening portion of the plastic pack container and seals the pack container is bonded onto the upper surface of the flange portion surrounding the opening portion. Therefore, it is difficult to peel off this seal portion with a hand, which is similar to the case in the conventional pack. In the invention, in order to solve this difficulty and maintain perfect sealing, the seal film is bonded onto the upper surface of the flange portion surrounding the opening portion, and also the peeling film having a reinforcement function is bonded onto the lower surface of the flange portion. Further, the broken portion including the cut-off line and the connection part is formed in a part or the whole of its flange portion, whereby the flange portion is previously put in a separable state into the inner portion and the outer portion.

Since this flange portion is put in the separable state into the inner portion and the outer portion, it is prevented that the flange portion is bent. Therefore, in the flange portion put in the separable state into the inner portion and the outer portion, the seal film that seals the opening portion is bonded onto the upper surface of the flange portion, and simultaneously the peeling film having the reinforcement function is bonded also onto the lower surface thereof. Accordingly, on the upper and lower surfaces of the flange portion, integration of the inner portion and the outer portion of the flange portion is kept by these films.

In order to put the flange portion in the separable state into the inner portion and the outer portion, some means and methods can be adopted. For example, by cutting the integrated flange portion, the flange portion may have the separable structure into the inner portion and the outer portion, by placing a narrow flange portion having only an inner portion opposite an outer portion, the flange portion may be integrally formed by a connection portion, or in the vacuum formation time by a container maker, a container in which the inner portion and the outer portion of the flange portion are integrated by the connection portion may be formed. Namely, the separable structure of the flange portion has a continuous line-shaped cut-off constitution which includes a cut-off line that separates the flange portion into the inner and outer portions, or dashed line-shaped or chain line-shaped cut-off constitution which includes a cut-off line and a connection portion that connects the inner and outer portions.

The structure of the broken portion which can separate the flange portion into the inner portion and the outer portion may be provided in the entire area of the flange portion provided so as to surround the opening portion of the pack container, or may be provided in only a part thereof. Further, the cut-off lines may be continued with one stroke or may not be so. The broken portion, in case that it is provided on all side portions of, for example, a polygonal pack container, can cut off the outer portion of the flange portion completely from the cut-off lines. However, the broken portion may be provided on only a part of the side portions. In case that the contents filled in the pack container has a flowable nature, even partial unsealing of the seal film makes it possible for the contents be completely taken out of the pack container without hindrance.

In the flange portion having the separable structure into the inner portion and the outer portion, onto any surface of the lower surface and the upper surface, the peeling film having the reinforcement function or the seal film is bonded, and the bonding portion spreads from the inner portion of the flange portion till the outer portion thereof, both of which are necessary conditions. However, both of strong bonding, that is, difficult-peel bonding, and weak bonding, that is, easy-peel bonding are used in bonding. The strong bonding portion is applied to bonding between the seal film and the outer portion of the flange portion. Further, it is desirable that the weak bonding portions are applied to bonding between the seal film and the inner portion of the flange portion, and bonding between the peeling film and the inner portion of the flange portion or the outer portion thereof.

For example, in case that the plane shape of the opening portion is tetragonal and the broken portion is formed on two sides, three sides, or four sides of the tetragonal flange portion like a tofu packed container, as the peeling film bonding to the lower surface of the flange portion, a blanked type can be used, which is formed by an integrated matter having nearly the same shape as the shape of the broken portion of the flange portion, that is, as the shape having two sides, three sides or four sides. Further, in the same case, the peeling film bonding onto the lower surface of the flange portion may be formed by a linear tape which bonds individually to each side of the two sides, the three sides, or the four sides of the flange portion. It is desirable that the linear tape has a width that is slightly narrower than the width of the lower surface of the flange portion. Regarding the slightly narrower width, for example, in case of a pack container having size of about 12×8 cm and the flange width of about 9 mm, a tape having the width of 8 to 8.5 mm which is narrower than the flange width by 0.5 to 1.0 mm (about 5 to 11 percent decrease of the flange portion width) is best. The largest advantage of using the linear tape is to require 10 to 15 percent using amount of the blanked type film and small cost.

In case that the linear tape is used as the peeling film, the broken portion for the flange portion can be formed in the pack container maker by an existing press machine. Therefore, for the rest, only the step of bonding the linear tape is required, so that the apparatus can be manufactured at a low cost. Since only the addition of the bonding step is required, it is easy to add the bonding step to the process by the molding and shearing machine in the pack container maker, and its addition does not impair mass productivity. As the bonding method of the linear tape, there are a method of bonding the tapes direction by direction, a method of bonding the parallel two tapes at the same time, and a method of bonding the three-directional tapes at the same time. In case that the linear film is bonded onto the two and more sides of the flange portion, the linear film to be firstly bonded requires double-side adhesion by which the first linear film adheres also to the film to be bonded secondarily. To the contrary, since the film to be secondarily bonded adheres only to the firstly bonded film, it may have single-side adhesion.

The pack container which can use the linear tape is a pack container in which the plane shape of the opening portion is polygonal as well as a pack container in which the plane shape of the opening portion is tetragonal. Other pack containers than the tetragonal pack container, for example, a triangular pack container, a pentagonal pack container, a hexagonal pack container, and an octagonal pack container are actually used as food containers with high possibility. Further, the invention can be applied to any of the above pack containers. Further, the invention can be applied also to a pack container in which the plane shape of the opening portion is circular or oval. In case that the broken portion is formed in a part or the entire periphery of the flange portion of the circular or oval pack container, the peeling film to be bonded onto the lower surface of the flange portion is formed by an arc-shaped tape, or a circular or oval integrated matter.

In order to facilitate the peeling operation of the peeling film, the peeling-start portion is provided so as to protrude outward or inward of the peeling film, and peeling in the longitudinal direction along the flange portion can be started from this peeling-start portion. The peeling-start portion can be formed by providing a protruding portion for the peeling film. In case that the peeling film is the blanked type, the protruding portion may be provided in only one place or in several places. By this constitution, the peeling-start portion is located outward or inward of the flange portion of the pack container. The inward position is a position hard to see in appearance. However, in case that the pack container is held with a hand, the peeling-start portion is located in a position where the fingertip that pinches the flange portion touches the peeling-start portion. Therefore, a question of "what's this" occurs to the consumers, and this inward peeling-start portion gives the consumers an opportunity to find that this is the unsealing means. The outward peeling-start portion is easy to find and determine that this is the unsealing means. Coloring can be provided for this peeling-start portion in order to make the peeling-start portion prominent.

In the above description, regarding the peeling film and the seal film, the word of "film" is used in both. This does not mean that the both films are the same though they may be the same or similar. It is because: since the peeling film is used in order to reinforce the flange portion that is divided at the broken portion into two of the inner portion and the outer portion, the peeling film uses the thick material, while the seal film does not need to reinforce the flange portion. In a field of synthetic resin industry, a film having the thickness of $\frac{1}{100}$ inch and more, that is, the thickness of about 0.25 mm and more, alias a sheet is more suitable for the peel and reinforcement film. It is enough that the thickness of the seal film is about 0.25 mm or less.

It is desirable that: the pack container is formed of polyethylene terephthalate, polyester, polypropylene, polyethylene, or any of materials having the same advantages as those of the above materials; and in a state where the seal film and the peeling film are bonded onto the pack container, the flange portion has such strength as not to be bent at the cut-off line. However, the connection portion, when the peeling film is peeled and the broken portion is exposed, must be broken readily by the fingertip. As such the material having a limitative stiffness, the aforesaid resins are suitable.

Since the sealed container of the invention is constituted and acts as described above, the peeling-start portion is easy to find, and unsealing is facilitated by peeling the peeling film along the flange portion in the longitudinal direction. Further, in the invention, apprehension with respect to unsealing is not a concern for a manufacturer which deals in the pack containers, a maker which packs goods such as tofu, a maker which conveys and sells goods in pack containers, or end consumers. For example, an apprehension that the pack container will be opened in error in a manufacturing and distributing process is not a concern for the makers, and an apprehension that the pack container will be opened on the way is not a concern to consumers that have gotten the goods. Further, in case of the pack container in which the plane shape of the opening portion is particularly tetragonal, or other polygonal shape, the linear tape can be used as the peeling film. Therefore, 10 to 15 percent using amount of the blanked type film having the same advantage is enough and cost is reduced greatly.

DETAILED DESCRIPTION

Figure 1:
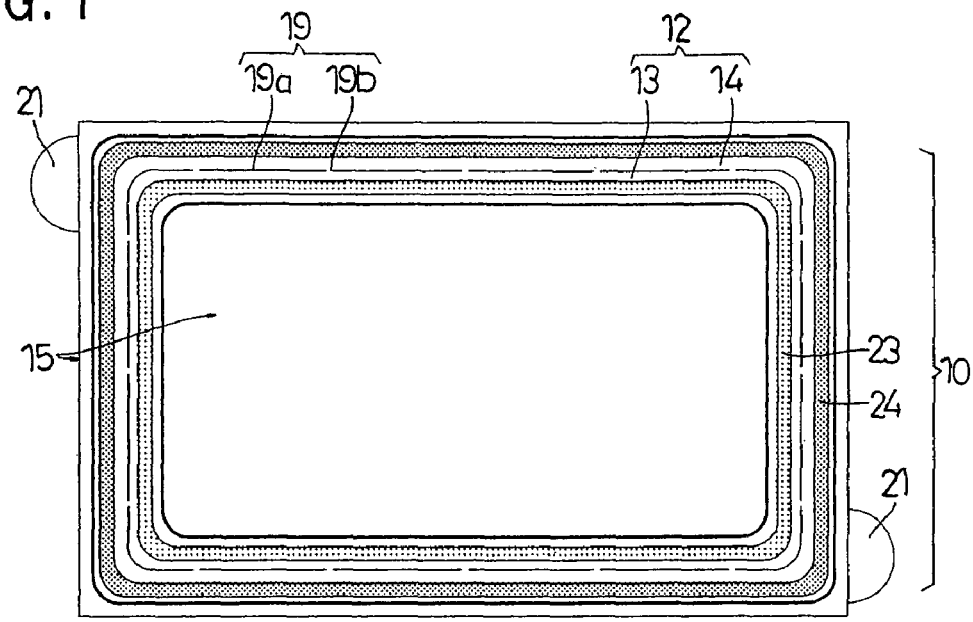
FIG. 1 is a plan view showing a first embodiment of an easy-open sealed container according to the invention.
Figure 2:
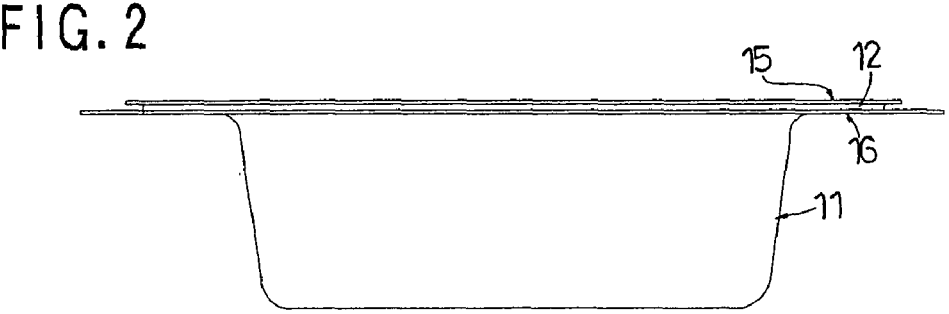
FIG. 2 is a front view of the same.
Figure 3:
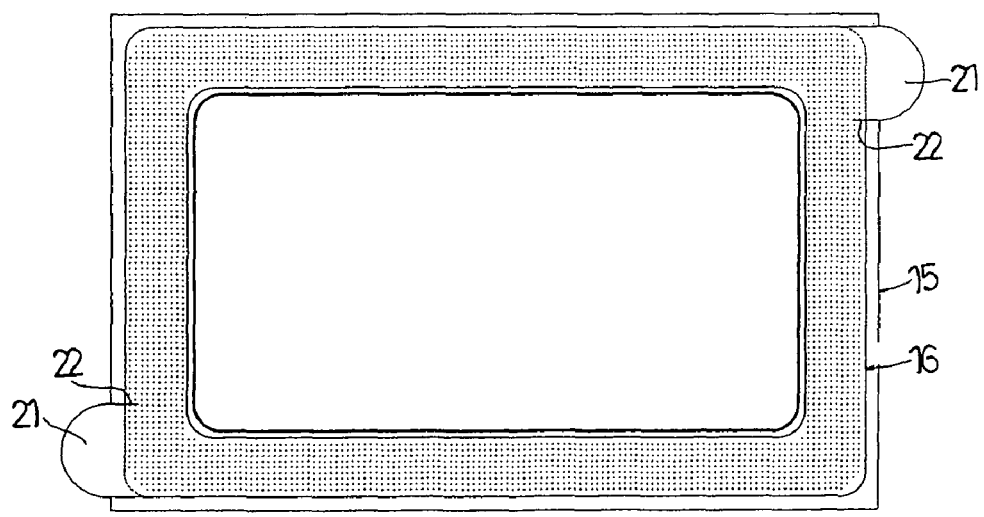
FIG. 3 is a bottom view of the same.

With reference to various embodiments, the invention will be described below in more detail. FIGS. 1 to 8 show a first embodiment of an easy-open sealed container according to the invention, in which a reference numeral 11 is a pack container in which the plane shape of an opening portion is tetragonal, and a reference numeral 12 is a flange portion surrounding the tetragonal opening portion, which has a broken portion 19 as a boundary between an inner portion 13 located near the opening portion and an outer portion 14 located near the peripheral edge. Further, a reference numeral 15 is a seal film which covers the opening portion of the pack container and seals the pack container, and a reference numeral 16 is a peeling film having a reinforcement function, which is bonded onto the lower surface of the flange portion 12 having the broken portion 19, extending to the two portions of the inner portion 13 and the outer portion 14. In a bonding portion between the peeling film 16 and the flange portion 12, a reference numeral 17 is an inner bonding portion, and a reference numeral 18 is an outer bonding portion (refer to FIGS. 7 and 8). Bonding of the seal film 15 is performed after goods such as tofu has been stored in the pack container 11.

In the first embodiment, the broken portion 19 which divides the flange portion 12 into the inner portion 13 and the outer portion 14, in order to make the outer portion 14 separable, has a cut-off line 19a and a connection portion 19b which has not been cut off yet. In the shown broken portion 19, the very short connection portion 19b is arranged between the long cut-off lines 19a. The sizes of length and width of the cut-off line 19a and the connection portion 19b can be determined arbitrarily. However, the connection portion 19b must satisfy both of the following conditions: prevention of division between the inner portion 13 and the outer portion 14 until the peeling film 16 is bonded; and facility in brokenness in the pack opening time. In a state before the pack container is opened in which the seal film 15 and the peeling film 16 have been bonded onto the flange portion 12, even if bending power is applied onto the flange portion 12, the integrity of the flange portion 12 is maintained.

Figure 4:
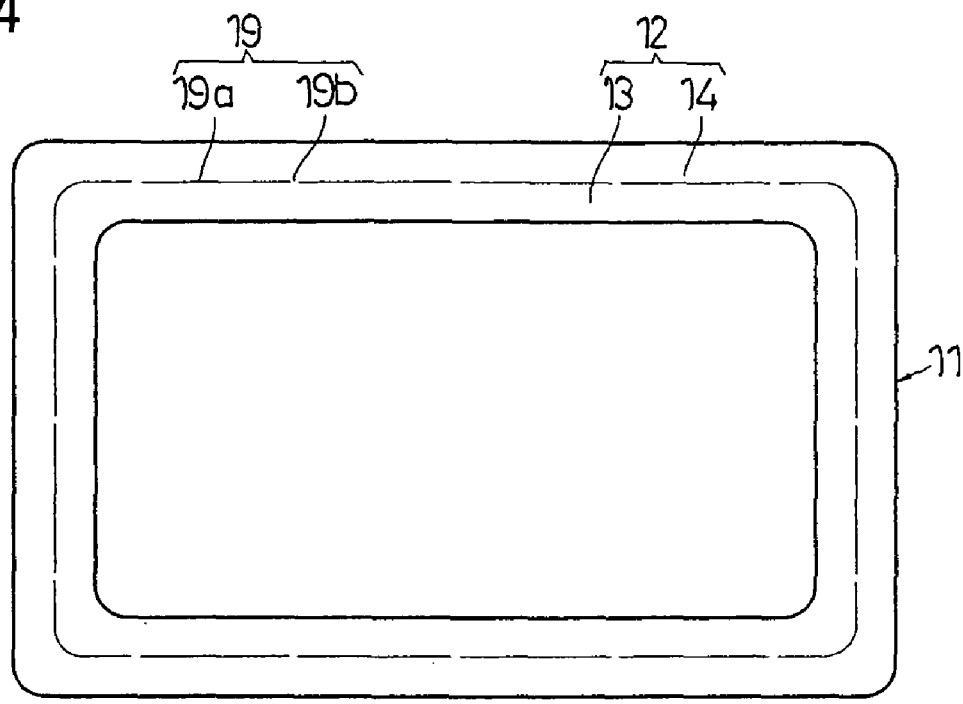
FIG. 4 is a plan view of a pack container in which a broken portion is formed, showing a state before seal and peeling films are bonded.
Figure 5:
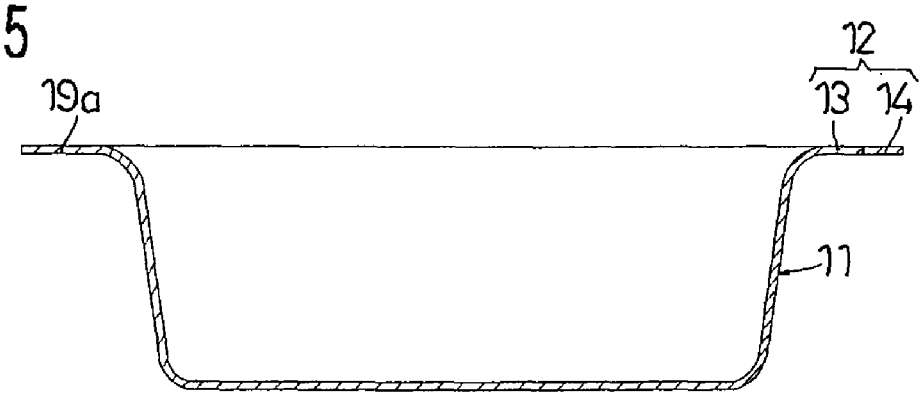
FIG. 5 is a sectional view of the same.

FIGS. 4 and 5 show a form of only the pack container in which the cut-off portion 19a and the connection portion 19b are formed. In case that the pack container 10 is, for example, a pack container for a piece of tofu, which is made of polypropylene having the sheet thickness of 0.4 mm, when the length of the cut-off line 19b formed by a knife of a machine is about 25 mm, and the width thereof is of a size which can be visually recognized as a line (about 0.1 mm), it is enough that the length of the connection portion 19b is about 0.1 to 0.3 mM. This length is in such a degree that a person cannot recognize the connection portion 19b unless he pays attention to it. The above numerical values are examples, and can be arbitrarily selected according to the conditions such as the thickness of the sheet and the film, and the size of the pack container.

Figure 6:
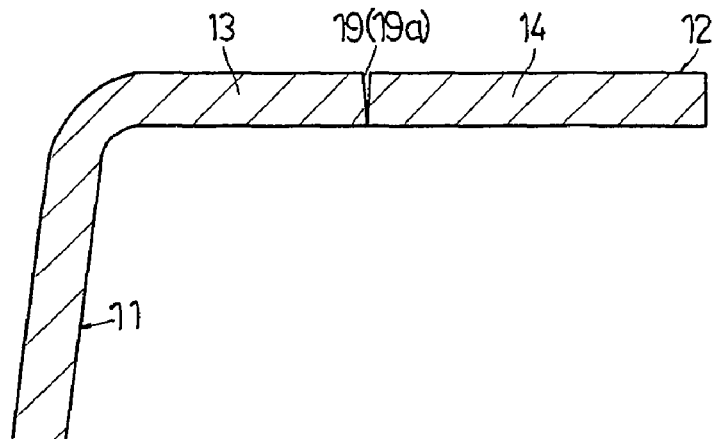
FIG. 6 is a sectional view of a flange portion of the same.
Figure 7:
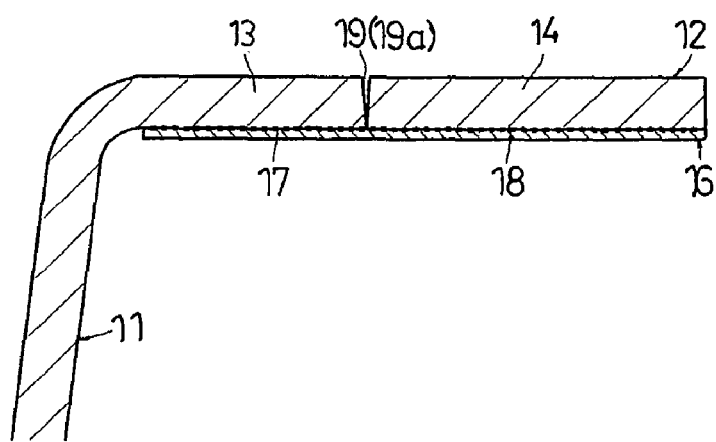
FIG. 7 is a sectional view in which the peeling film is bonded onto the flange portion.
Figure 8:
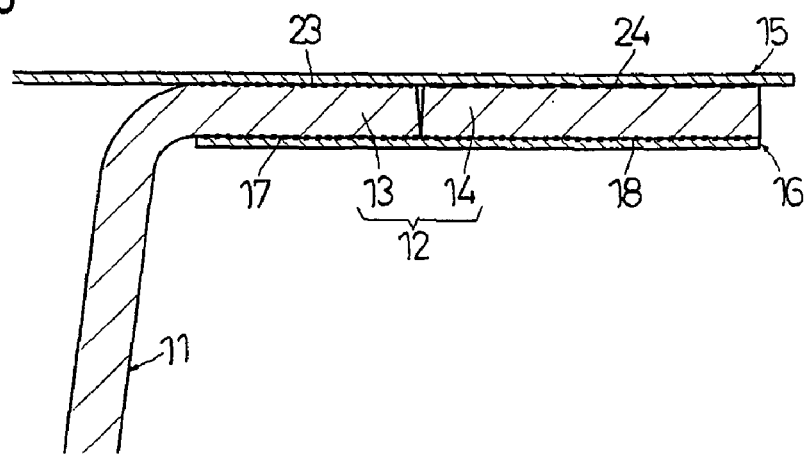
FIG. 8 is a sectional view in which the seal film is further bonded onto the flange portion.

In case that the sealed container in the first embodiment is formed, the broken portion 19 is formed in the flange portion 12 by the knife of the machine. In this broken portion 19, the inner portion 13 and the outer portion 14 are connected by the connection portion 19b so as not to be separated (FIG. 6). The peeling film 16 is bonded onto the lower surface of the flange portion 12 at the inner bonding portion 17 and the outer bonding portion 18 (FIG. 7). In bonding strength, both of the inner bonding portion 17 and the outer bonding portion 18 may be weak. However, the peeling film 16 uses material that stays weak in bonding strength even if the bonding temperature is increased. Thereafter, the seal film 15 is bonded onto the upper surface of the flange portion, extending to the two portions of the inner portion 13 and the outer portion 14 (FIG. 8). At the bonding portion between the seal film 15 and the flange portion 12, a reference numeral 23 is an inner bonding portion, which is weak in bonding strength, and a reference numeral 24 is an outer bonding portion, which is strong in bonding strength. It is desirable that the seal film 15 uses material that becomes high in bonding strength according to the bonding temperature.

The seal film 15 and the peeling film 16 are bonded onto the upper and lower surfaces of the flange portion 12 respectively at the two portions of the inner portion 13 and the outer portion 14 in the broken portion 19, that is, at four portions in total. Of their four bonding portions, in the first embodiment, only the outer bonding portion 24 of the seal film 15 has strong bonding power, and all of the others have weak bonding power. Three weak bonding areas and one strong bonding area balances the whole, so that the sealed state can be maintained. When the peeling film 16 is peeled in the pack container opening time, only the outer bonding portion 24 that is strong in bonding power exists for the inner bonding portion 23 of the seal film 15 that is weak in bonding power, so that the seal film is put in a state where the seal film can be readily peeled.

Figure 9:
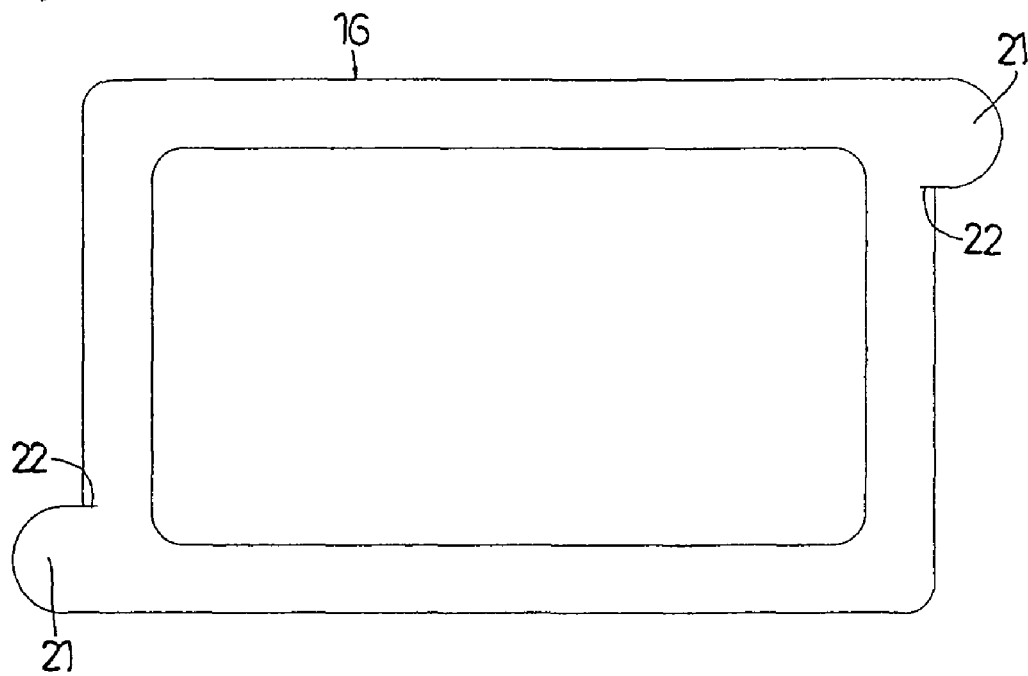
FIG. 9 is a bottom view of the peeling film.

The peeling film 16 having the reinforcement function in the first embodiment is formed in the shape of a picture frame which has the width that is slightly smaller than the width of the lower surface of the flange portion 12, and the length corresponding to the exact size of the flange portion 12 (FIG. 9). The peeling film 16 is an integral component with four continuous sides. At a part of this peeling film 16, a peeling-start portion 21 which protrudes outward of the flange portion 12 is provided. The illustrated peeling-start portions 21 are formed, at two corners, in the shape of a fingertip. The peeling-start portion 21 has the width which is larger than the width of the peeling film 16, and a cut 22 at the root of the protruding portion, whereby the peeling film 16 is surely divided laterally at the position of the cut 22, and so peeling can proceed longitudinally. Coloring may be provided for the peeling-start portion 21 in order to make the peeling-start portion prominent.

Figure 10:
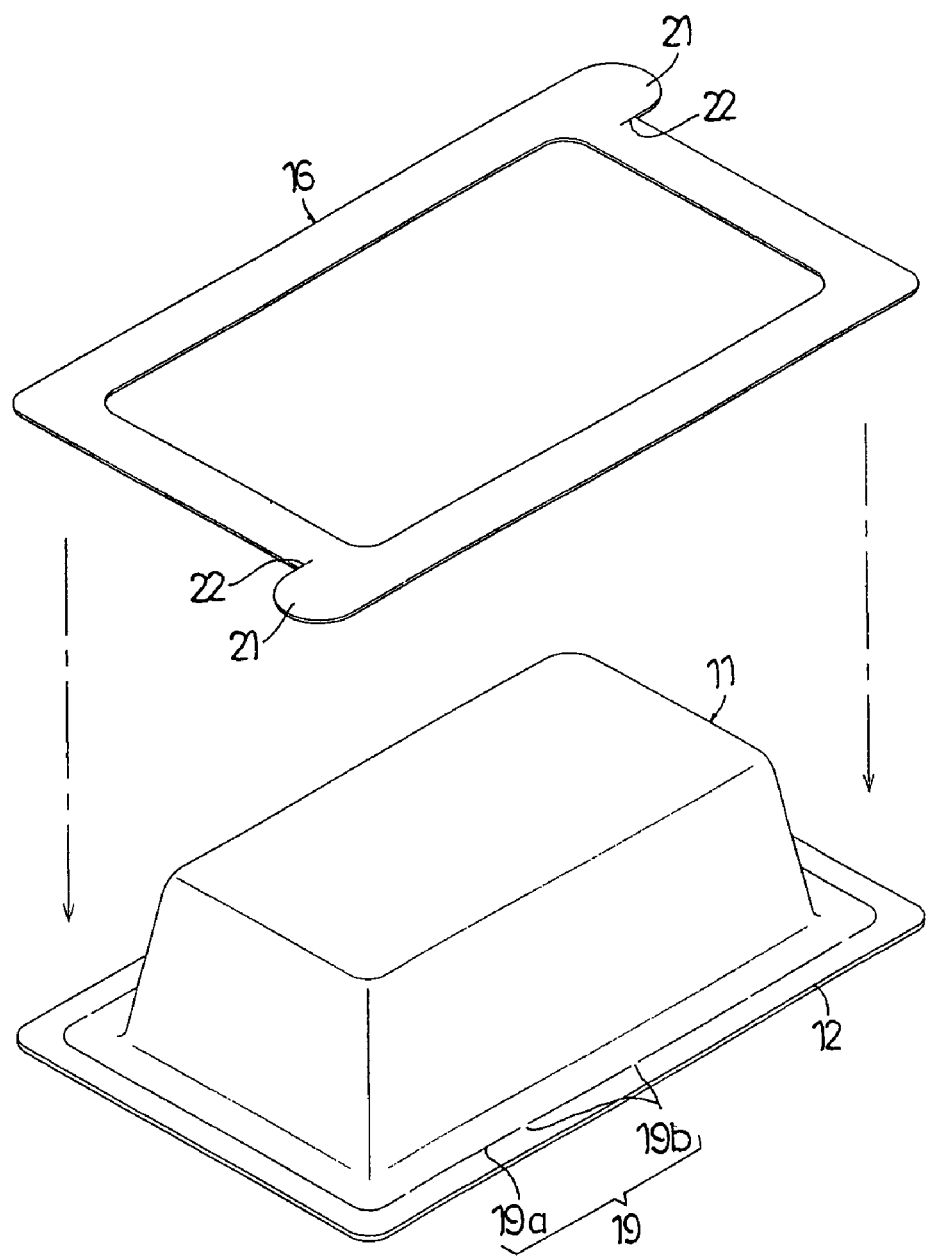
FIG. 10 is a diagram for explaining a state where the peeling film is bonded onto the flange.
Figure 11:
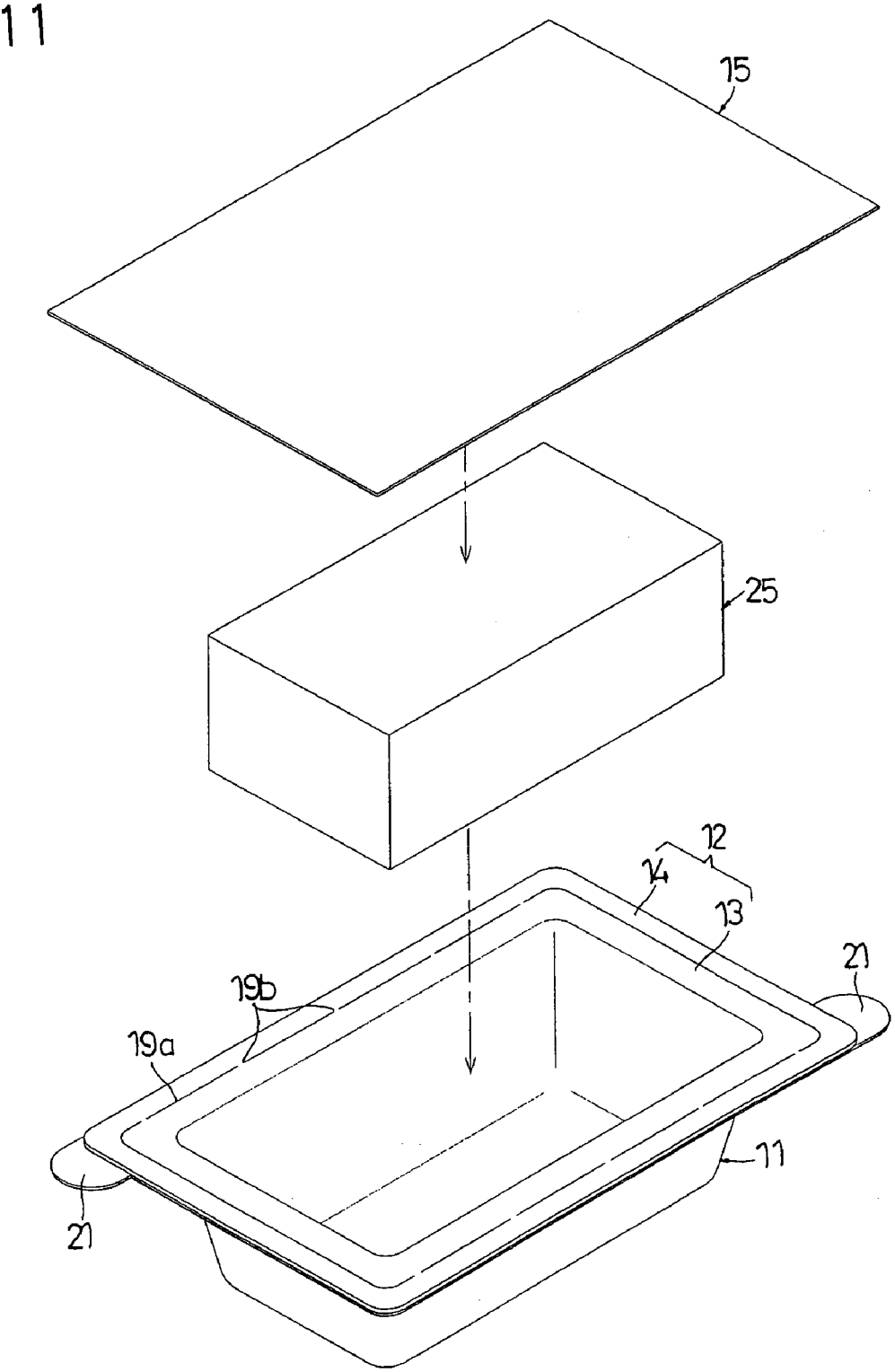
FIG. 11 is a diagram for explaining a state where a packed matter is sealed in the sealed container.

The peeling film 16 in FIG. 9 can be bonded onto the upside-down pack container 11 by being pressed from the upside by a heater. In the flange portion 12 of this pack container 11, as shown in FIG. 10, the broken portion 19 including the cut-off line 19a and the connection portion 19b has been already formed. The peeling film 16 is bonded onto this flange portion 12, a packed matter 25 such as tofe or konjak is packed in the pack container 11, and lastly the seal film is bonded (FIG. 11). The packing process will be described later with reference to FIG. 30. In the above description, an example is explained in which a tofu manufacturer, in a part of the process of producing individually the pack containers 11 of the invention, bonds the peeling film 16 onto the existing pack container 11. The process in which the invention is worked by a container maker will be described later.

Figure 12:
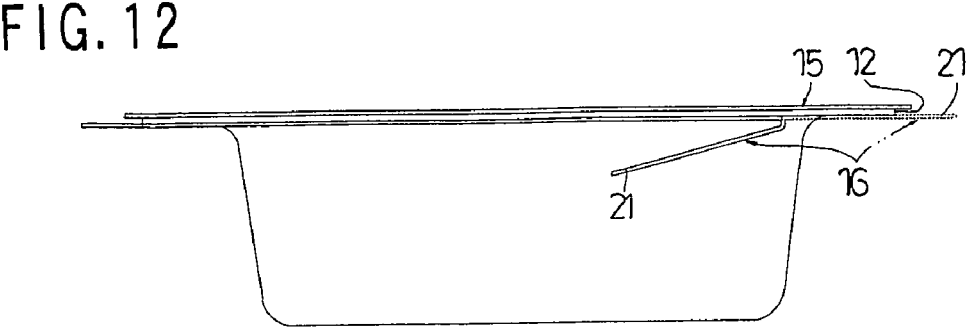
FIG. 12 is a front view showing a peeling-starting state.
Figure 13:
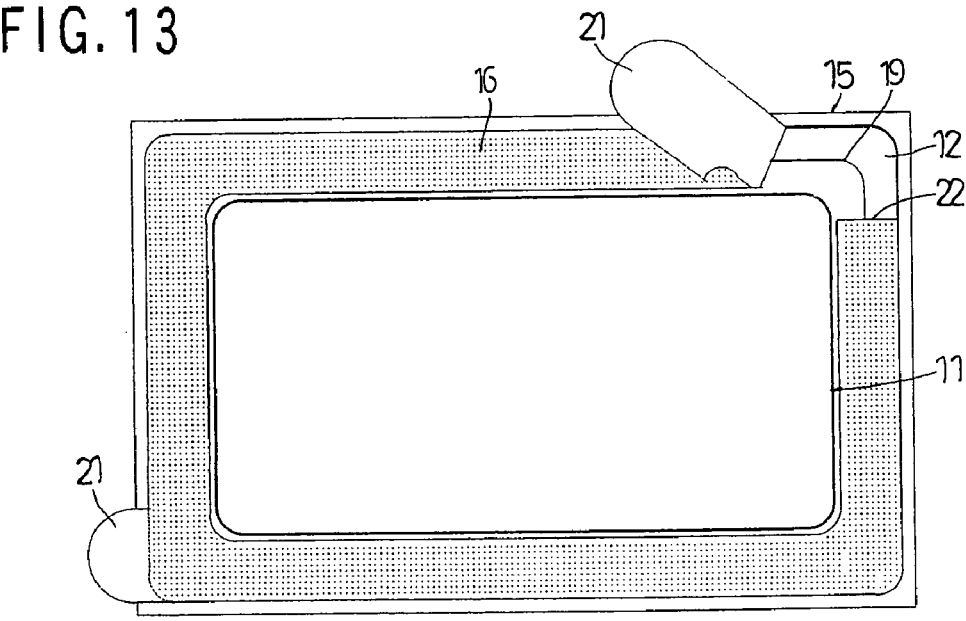
FIG. 13 is a bottom view in the state of FIG. 12.
Figure 14:
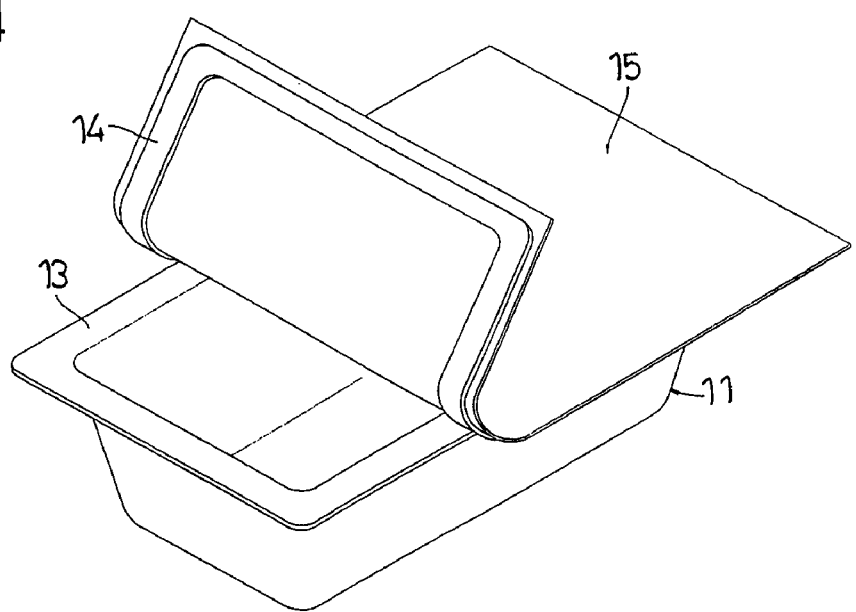
FIG. 14 is a perspective view showing a container opened state.

FIGS. 12 to 14 show an opening method of the sealed container 10 provided with the peeling-start portion 21 protruded outward. In the opening start time, the peeling-start portion 21 is pinched with the fingertips and pulled down, the peeling film 16 is divided at the notch-shaped cut 22 (FIG. 13), and the weak bonding portions (17, 18) are gradually peeled longitudinally along the flange portion 12. When the whole of the peeling film 16 is peeled and removed, the cut-off line 19a and the connection portion 19b are exposed (FIG. 13 shows a back surface of the sealed container). Therefore, while the connection portion 19b of the broken portion 19 is being broken, the seal film 15 can be peeled. When the connection portion 19b is broken, since the seal film 15 is bonded only at the weak bonding portion 23 located on the inner side of the upper surface of the flange portion, the sealed pack can be opened with very little force, compared with the force necessary to peel the conventional seal film that has been completely bonded onto the entire width of the flange (Refer to FIG. 14).

Figure 15:
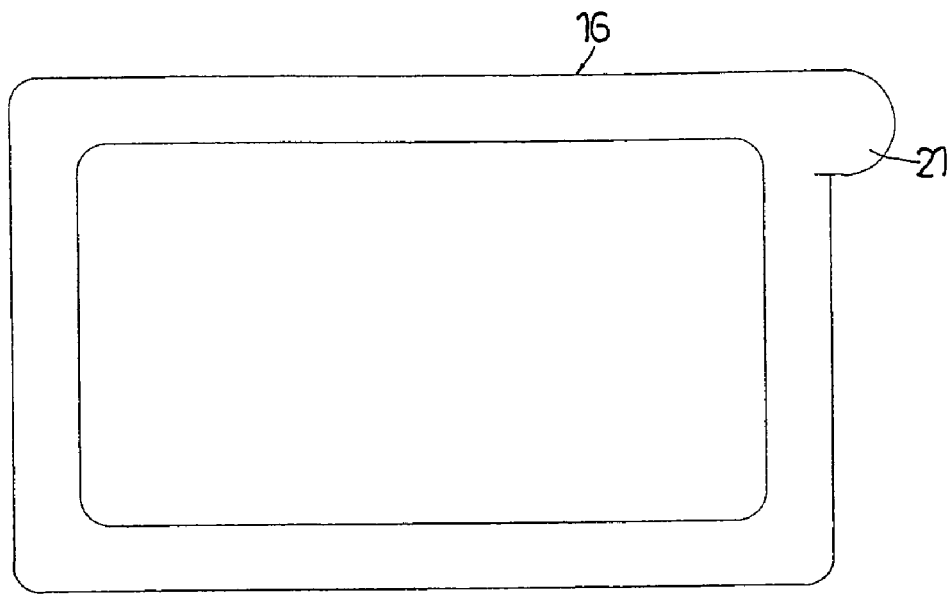
FIG. 15 is a plan view showing a modified example of the peeling film.
Figure 16:
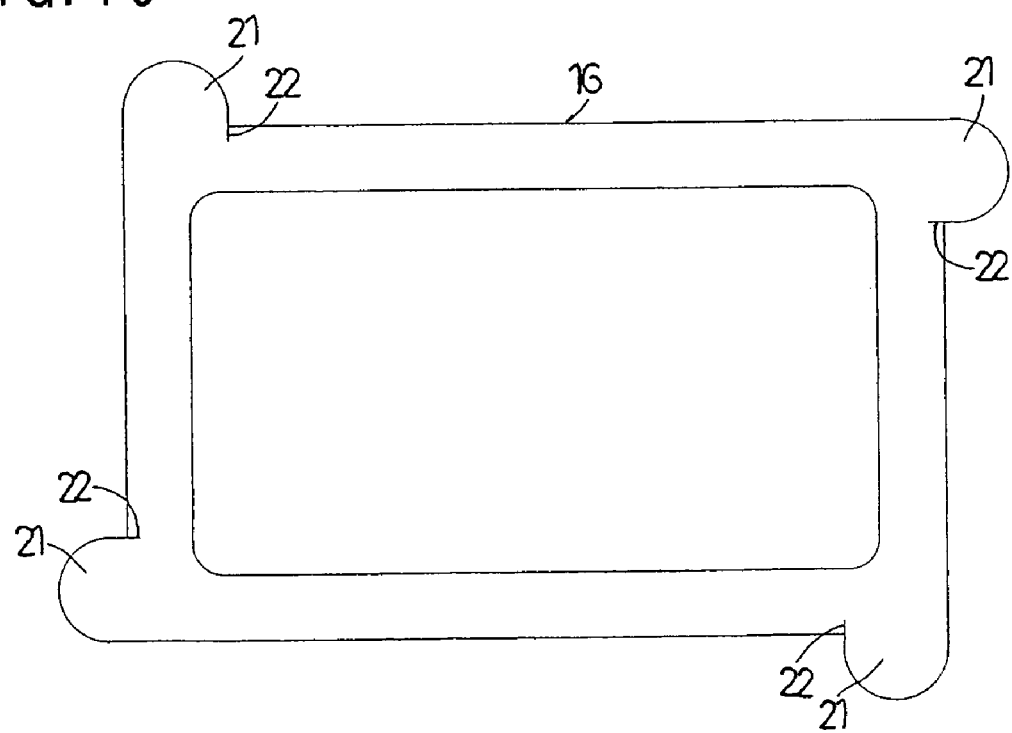
FIG. 16 is a plan view showing another modified example of the peeling film.
Figure 17:
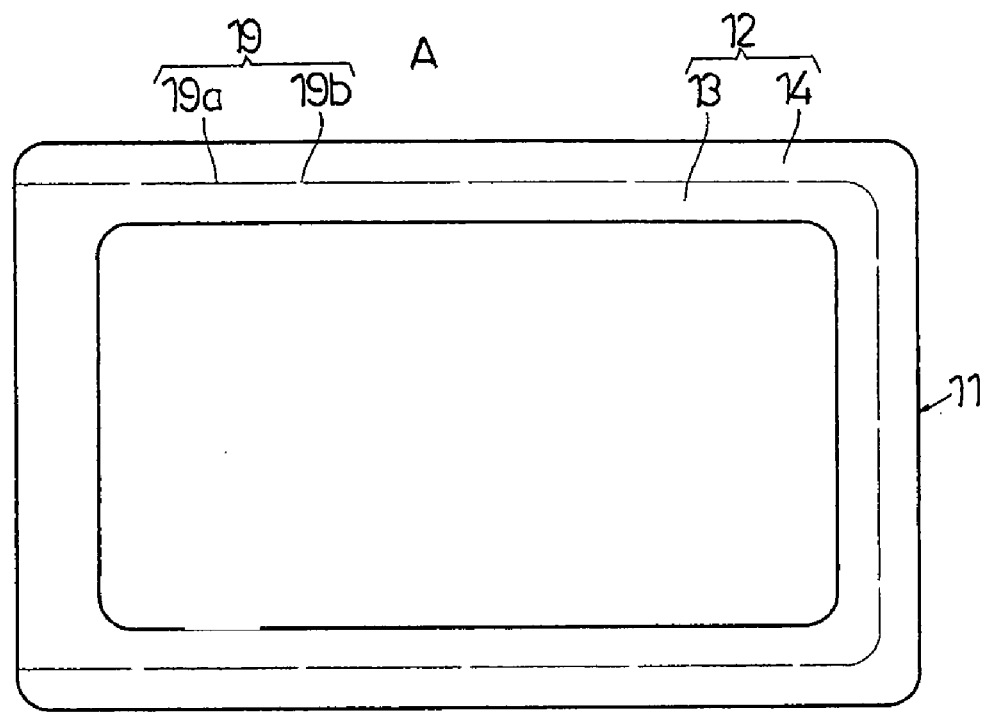
FIG. 17 is a plan view showing a modified example of the pack container.
Figure 17:
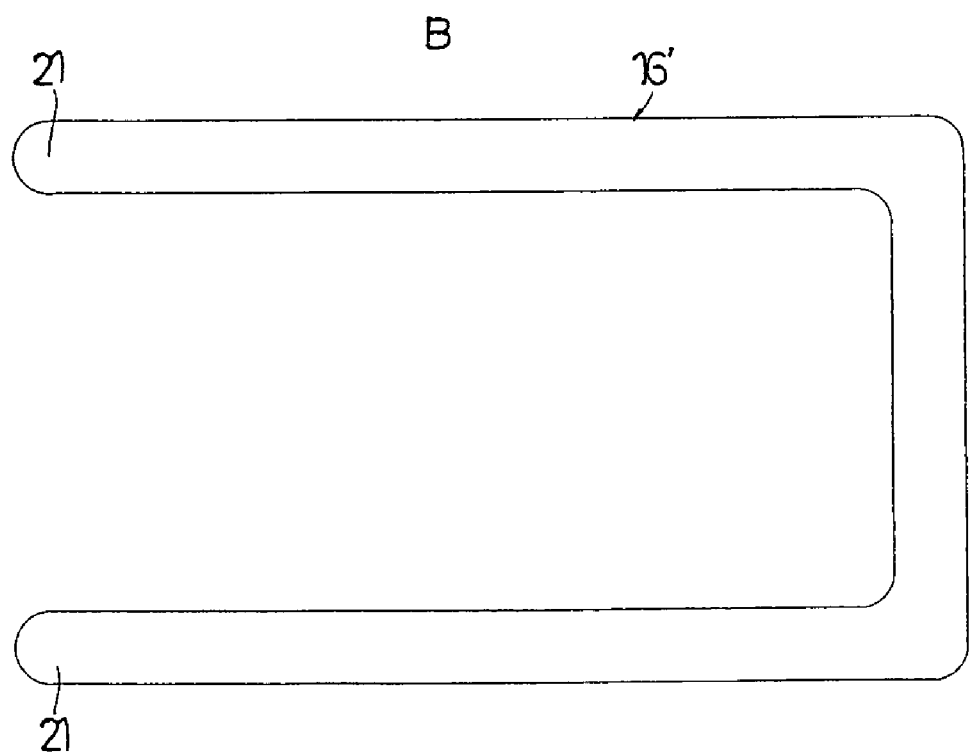
Figure 18:
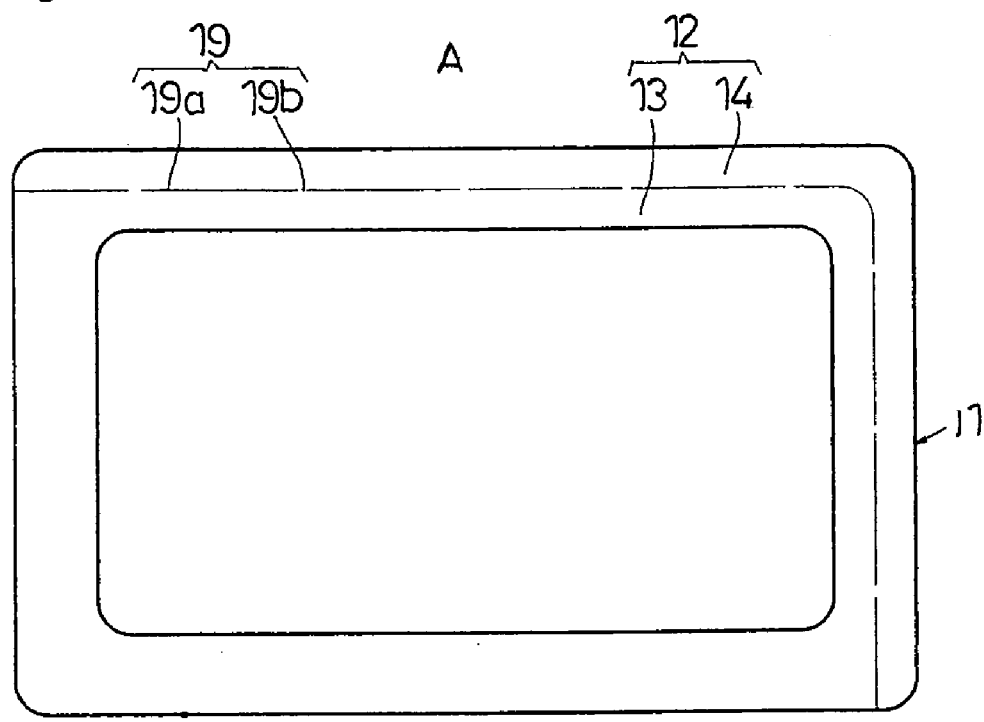
FIG. 18 is a plan view showing another modified example of the pack container.
Figure 18:
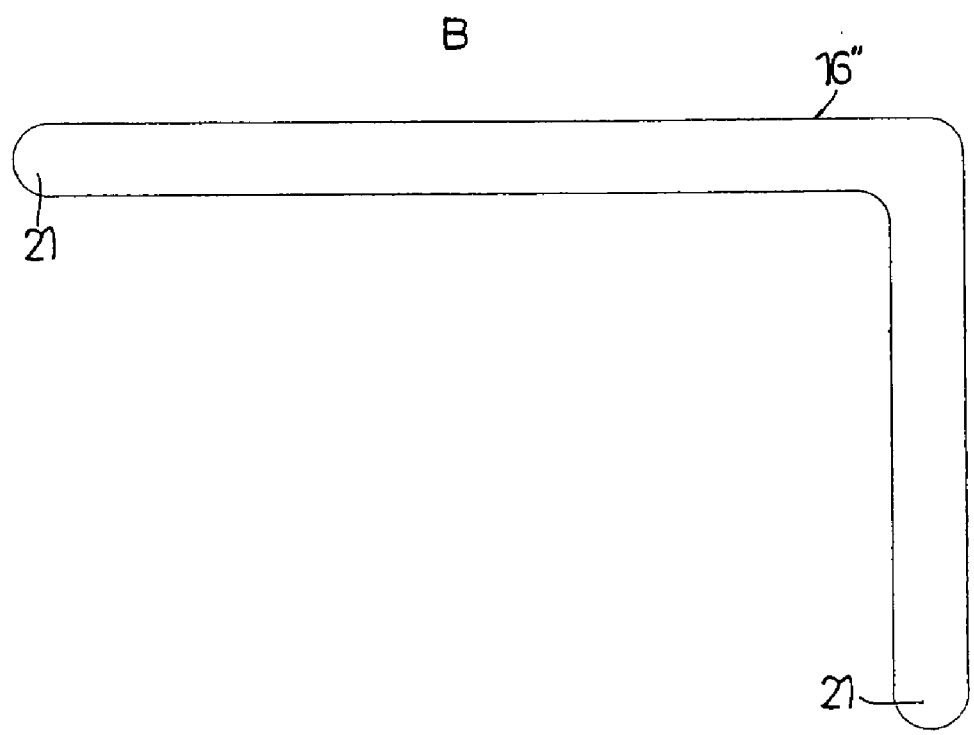

The position of the peeling-start portion 21, in case that the peeling-start portion 21 protrudes outward like the examples shown in FIGS. 1 to 14, is not limited to two diagonal spots but may be only one spot as shown in FIG. 15. In this case, though the peeling film 16 can be peeled throughout the entire periphery, there is also possibility that the peeling film will be torn on the way. FIG. 16 shows an example in which the peeling-start portions 21 are provided respectively at four corners, and not only the four long and short sides can be peeled separately but also all the four sides can be surely peeled. FIG. 17 shows an example of a peeling film 16' which is bonded onto three sides of the pack container 11 and is nearly C-shaped, in which peeling-start portions 21 protruding outward of the flange portion 12 of the pack container 11 are formed at leading ends of the film 16'. FIG. 18 shows an example of a peeling film 16" which is bonded onto two sides of the pack container 11 and is nearly L-shaped.

Figure 19:
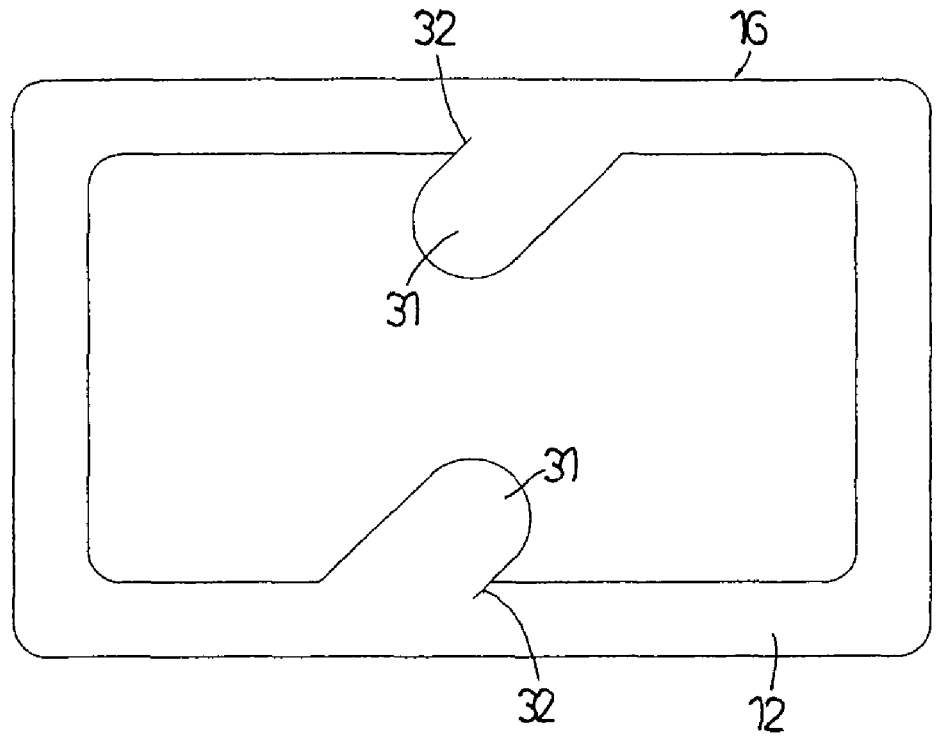
FIG. 19 is a plan view showing an example of an inward peeling-start portion.
Figure 20:
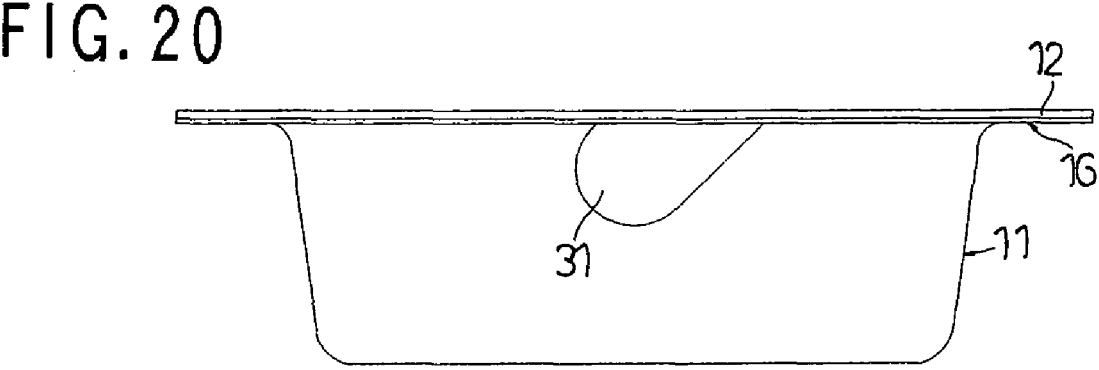
FIG. 20 is a front view of the pack container using the peeling film of FIG. 19.
Figure 21:
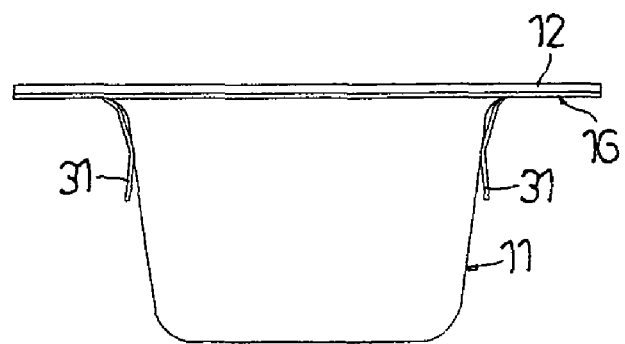
FIG. 21 is a side view of the same.
Figure 22:
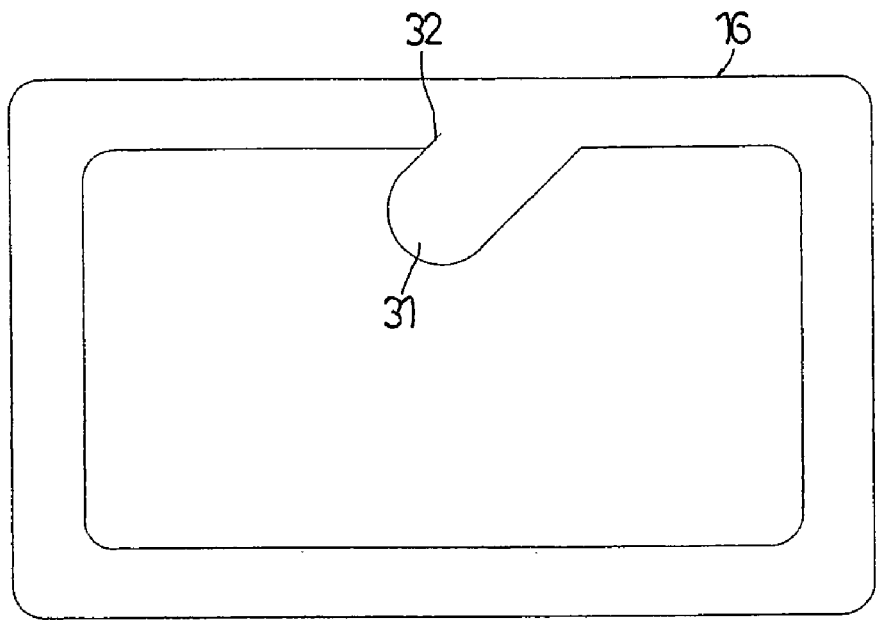
FIG. 22 is a plan view showing another example of the inward peeling-start portion.
Figure 23:
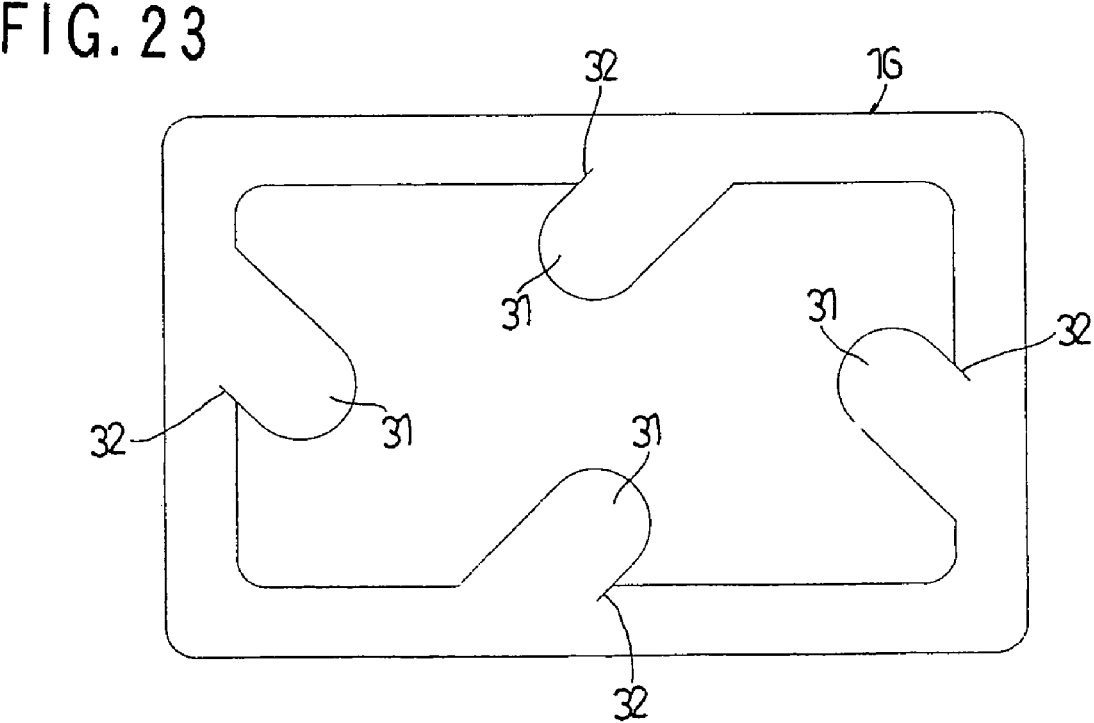
FIG. 23 is a sectional view showing another example of the inward peeling-start portion.

Further, the peeling-start portion may be so constituted as to be protruded inward of the flange portion 12, which is different from the aforesaid examples. FIGS. 19 to 23 show examples in which the peeling-start portion protrudes inward. In FIGS. 19 to 21, a peeling-start portion 31 is provided not at the corner of the peeling film 16 but in the middle position of the side portion. In order to give directivity to peeling, the peeling-start portion 31 is protruded obliquely, and has an oblique cut 32 at its root. In the following description, the components common to those in the first embodiment are denoted by the same reference numerals, and their detailed description is not repeated. The number and the positions of the peeling-start portions 31 can be changed arbitrarily. FIG. 22 shows an example in which there is only one peeling-start portion 31, and FIG. 23 shows an example in which there is one peeling-start portion 31 on each of four sides, that is, there are four peeling-start portions 31 in total. The meaning of these examples is the same as that of the examples explained in FIGS. 15 and 16.

Figure 24:
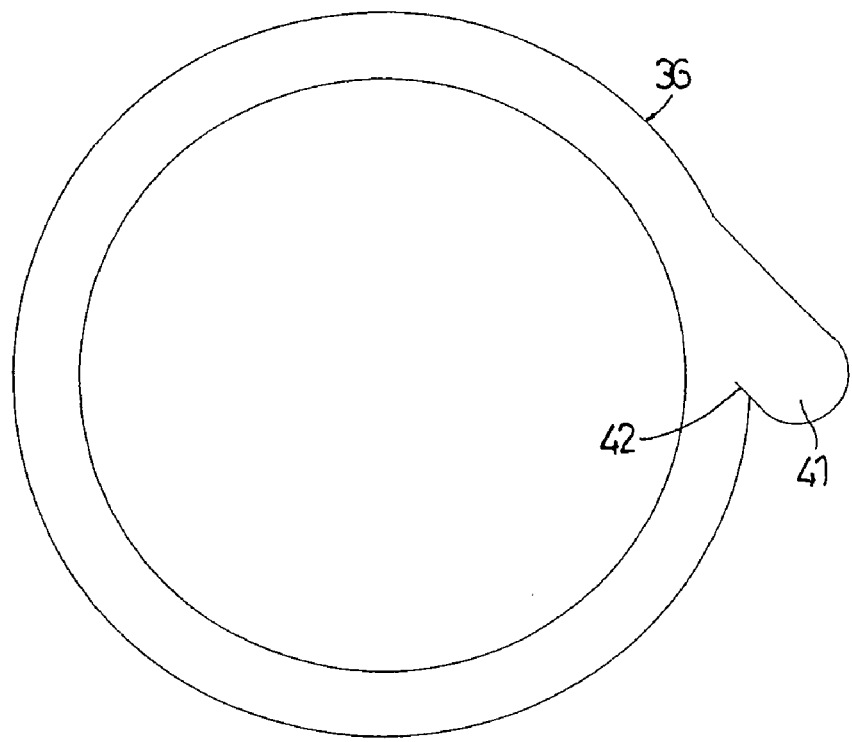
FIG. 24 is a plan view showing a modified example of the peeling film.
Figure 25:
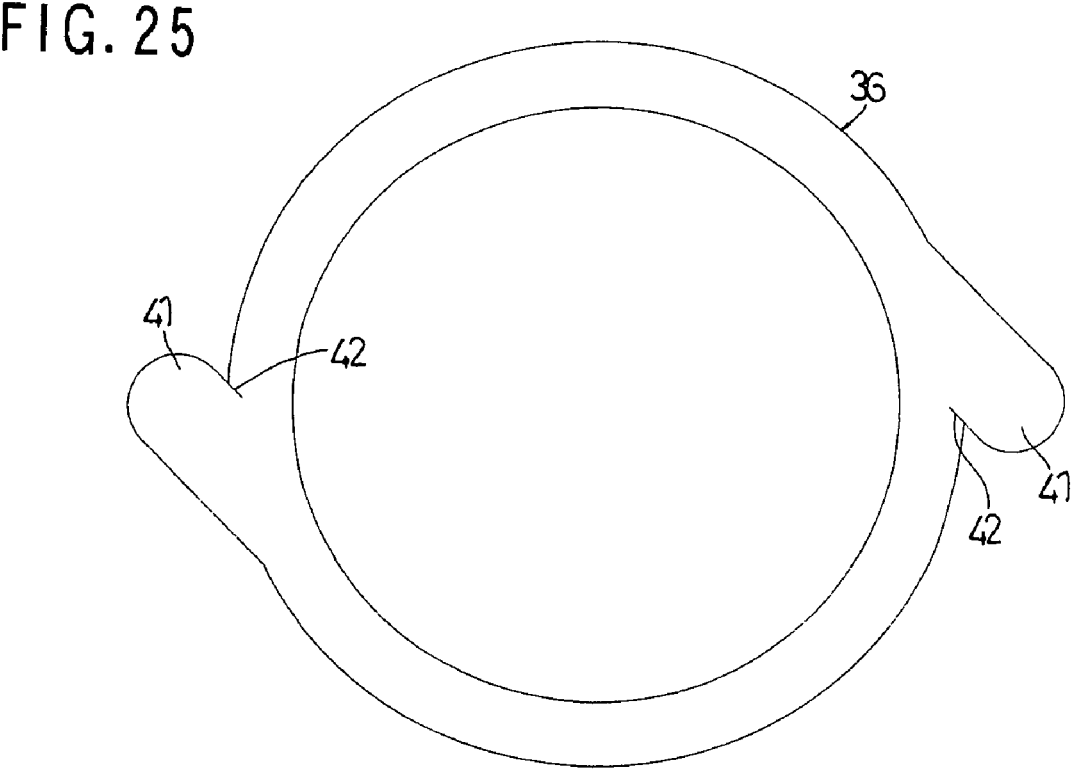
FIG. 25 is a plan view showing another modified example of the peeling film.

In the above description, the invention is applied to the tetragon pack container 11. However, the invention can be applied also to a circular pack container. With reference to FIGS. 24 to 27, this example will be described using a peeling film 36. A seal film which seals an opening portion of the circular pack container is also bonded onto the pack container similarly to the example shown in FIGS. 1 to 8. FIG. 24 shows an example in which only one outward peeling-start portion 41 is slantingly provided for the circular ring-shaped peeling film 36. In this example, the whole of the film 36 can be peeled at one time. FIG. 25 shows an example in which two outward peeling-start portions 41 are provided at intervals of 180 degrees. Reference numeral 42 is a cut portion, and the cut portions slant in the same direction.

Figure 26:
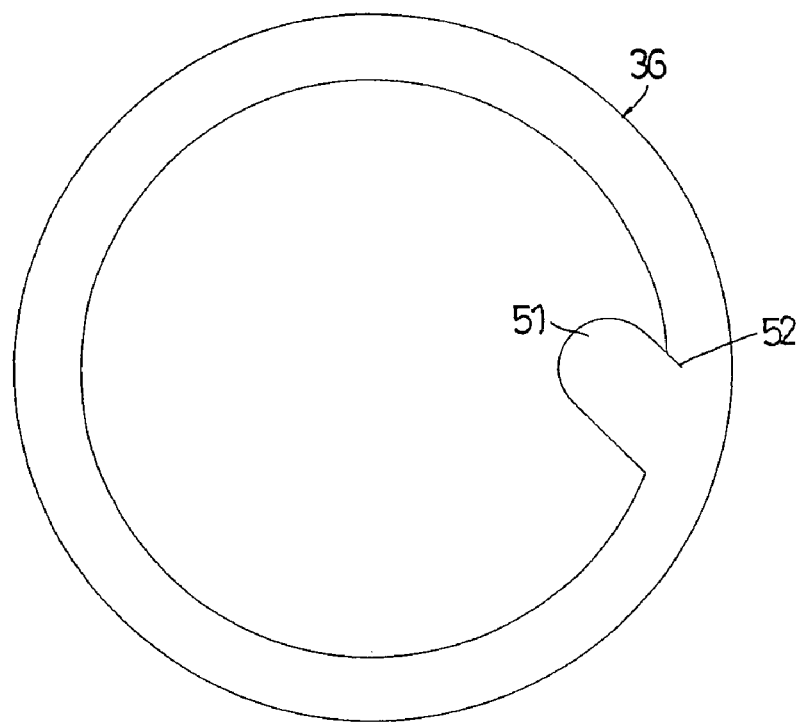
FIG. 26 is a plan view showing another modified example of the peeling film.
Figure 27:
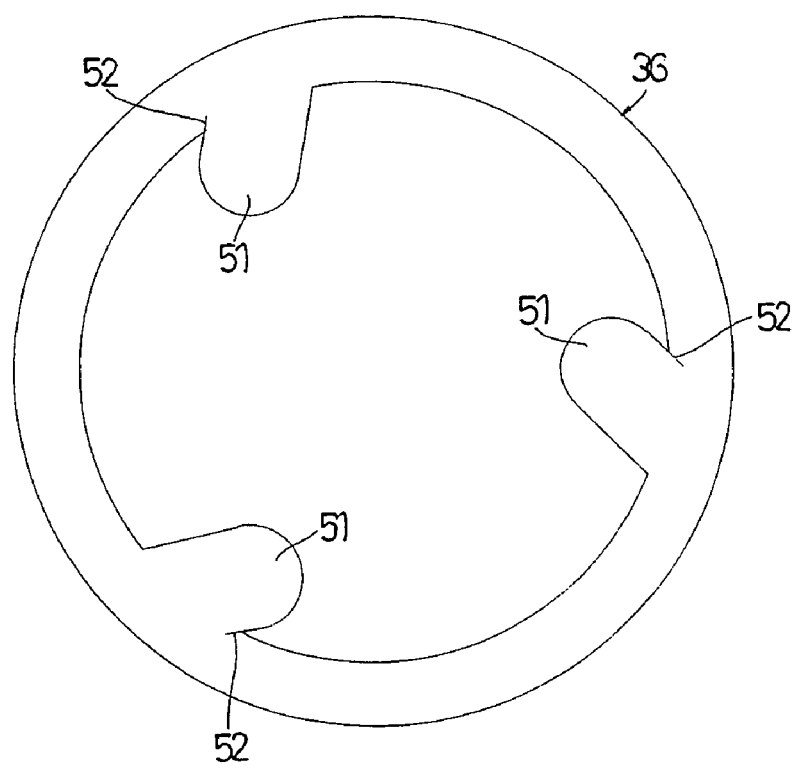
FIG. 27 is a plan view showing another modified example of the peeling film.

FIG. 26 shows an example of the circular ring-shaped peeling film 36 of the circular pack container, in which only one inward peeling-start portion 51 is slantingly provided. A reference numeral 52 is a cut portion. FIG. 27 shows an example in which three inward peeling-start portions 51 are slantingly provided for the circular ring-shaped peeling film 36 at equal intervals.

The peeling films 16, 16', 16", 36 having the peeling-start portions 21, 31, 41, 51 can be manufactured by being blanked by an edged tool formed in the shape of the corresponding peeling film. Though the cost of making the edged tool having the corresponding shape is not low, it is effective to use the blanked peeling film 16, in case that the pack container 11 of the invention is manufactured using the existing pack container. Particularly, in the case of the peeling film 16 having the peeling-start portion 21, 41 provided outward of the flange portion 12, a very complicated apparatus is required in order to mass-produce the peeling film 16 in the container maker. Therefore, the above manufacturing method is effective.

It is desirable that as the films used in the above cases, a film referred to as an easy-open film or an easy-peel film is used in any case. A film such as a laminated film is suitable, in which a surface is formed of a film which is strong in heat and difficult to tear such as polyethylene terephthalate (PET) or polyester, and a rear surface is formed of a film used as a bonding surface such as a sealant film (for example, as the seal film 15, CMPS013C by Tokyo cellophane Co., Ltd., and as the peeling film, CMPS201C by Tokyo cellophane Co., Ltd.). The above film is an example. In short, as long as the film used is a composite film consisting of a film that is strong for tear-strength and a film that is used as bonding means, or a film having both of tear-strength and bonding property, its film can be used as seal film 15 or the peeling film 16, using properties of the film by change in temperature.

Figure 30:
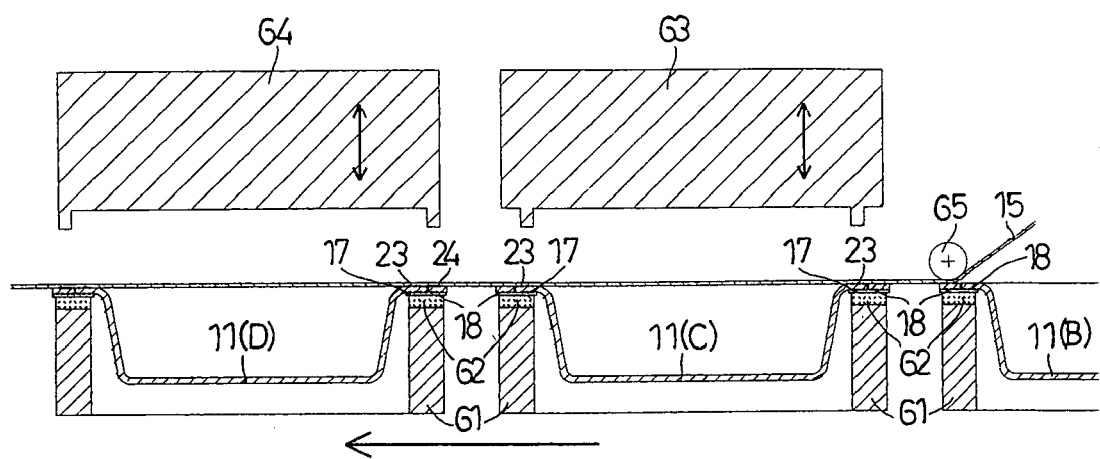
FIG. 30 is a sectional explanatory view showing a main portion of a manufacturing apparatus of the sealed container in enlargement.
Figure 31:
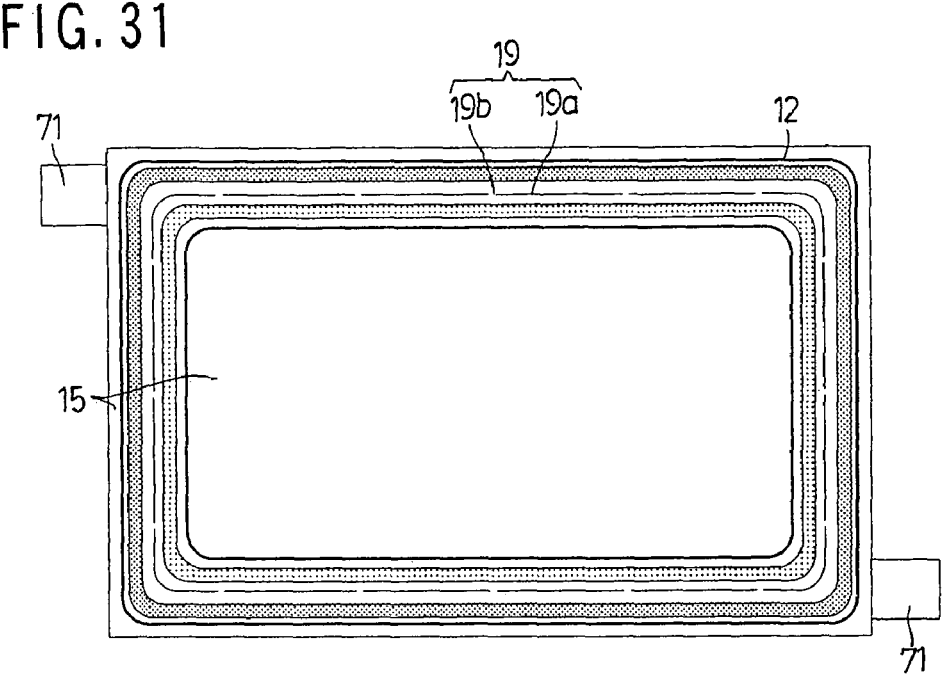
FIG. 31 is a plan view showing a second embodiment of the easy-open sealed container according to the invention.
Figure 32:
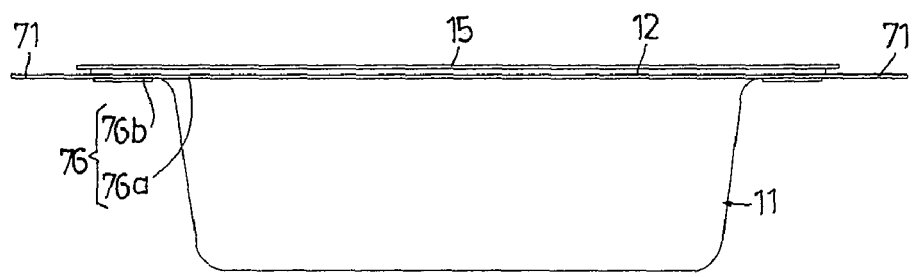
FIG. 32 is a front view of the same.

FIG. 30 shows a part of a packing process, in which a first heater 63 for the inner bonding portion and a second heater 64 for the outer bonding portion are lifted after completion of bonding. The whole of the manufacturing apparatus will be described later with reference to FIG. 37. A reference numeral 61 is bucket on which the container is put, and a reference numeral 62 is a cushion rubber. The bucket 61 goes for each step in the direction of an arrow from (B) to (C), and from (C) to (D). A reference numeral 65 represents a guide roller for the seal film 15. When the pack container 11 is located in the position (B), the seal film 15 has not yet been bonded onto the pack container 11. However, when the pack container 11 is located in the position (C), the seal film 15 is weakly bonded at the inner bonding portion 23. In a step when the pack container 11 comes to the position (D), the outer bonding portion 24 on the upper surface of the flange portion 12 is formed, and strong bonding is performed. However, bonding between the peeling film 16 and the flange portion 12 does not become strong. The first heater 63 may bond not only the inner bonding portion 23 but also the whole of the flange portion 12 to the seal film. This first heater 63 and the second heater 64 may be used in reverse order.

In manufacture of the easy-open sealed container according to the invention, the following two methods are contemplated: a method of manufacturing this container immediately before the packing step (a method of remodeling the usual container on the market); and a method of previously manufacturing this container by the container maker). Firstly, in case that the sealed container of the invention is manufactured by remodeling the usual container on the market, the broken portion 19 is formed in the flange portion 12 of the pack container 11 by the edged tool in the machine, the peeling film 16 cut by the edged tool of another machine is put onto the upside-down pack container 11, and the peeling film 16 is bonded by the heater. Thereafter, in case that the contents are not put into the container, they are put therein and the container is sealed by the seal film 15, again using the packing machine shown in FIG. 30, whereby the goods packed in the container to which the invention is applied is finished.

Figure 28:
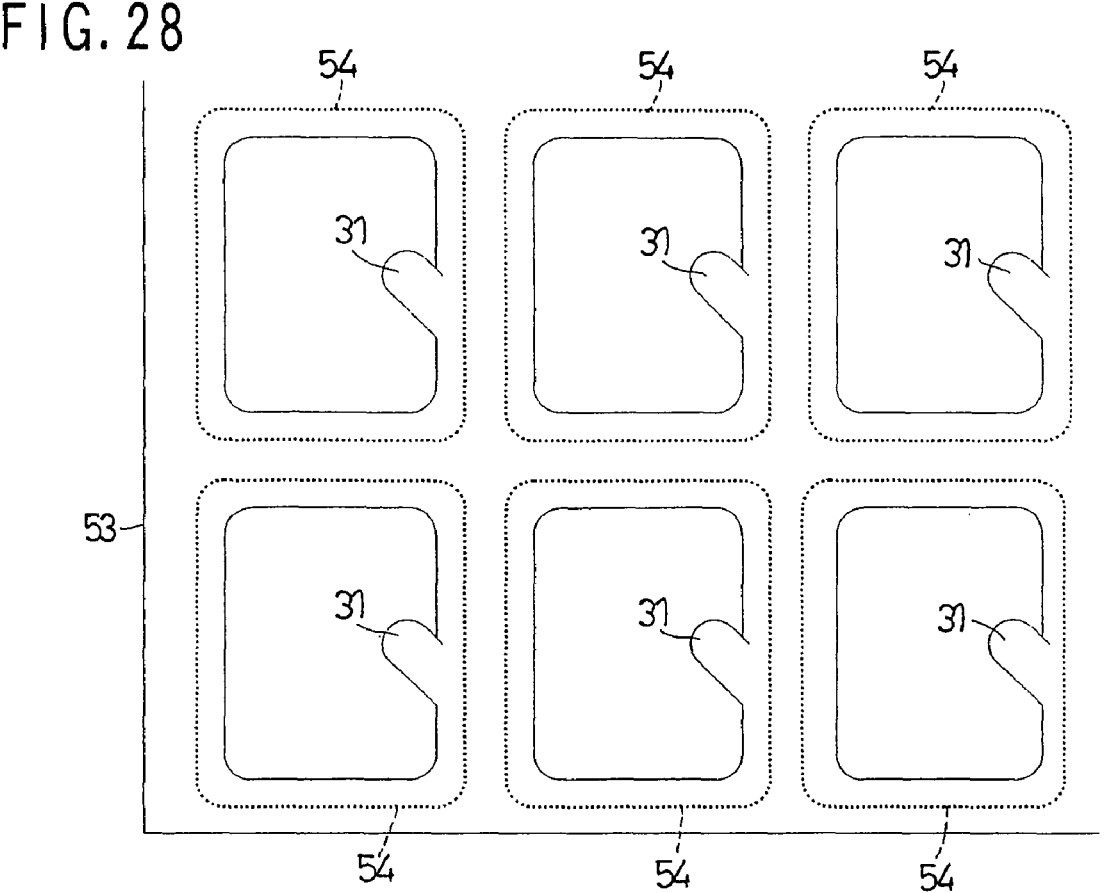
FIG. 28 is a plan view showing a production example of the peeling film.
Figure 29:
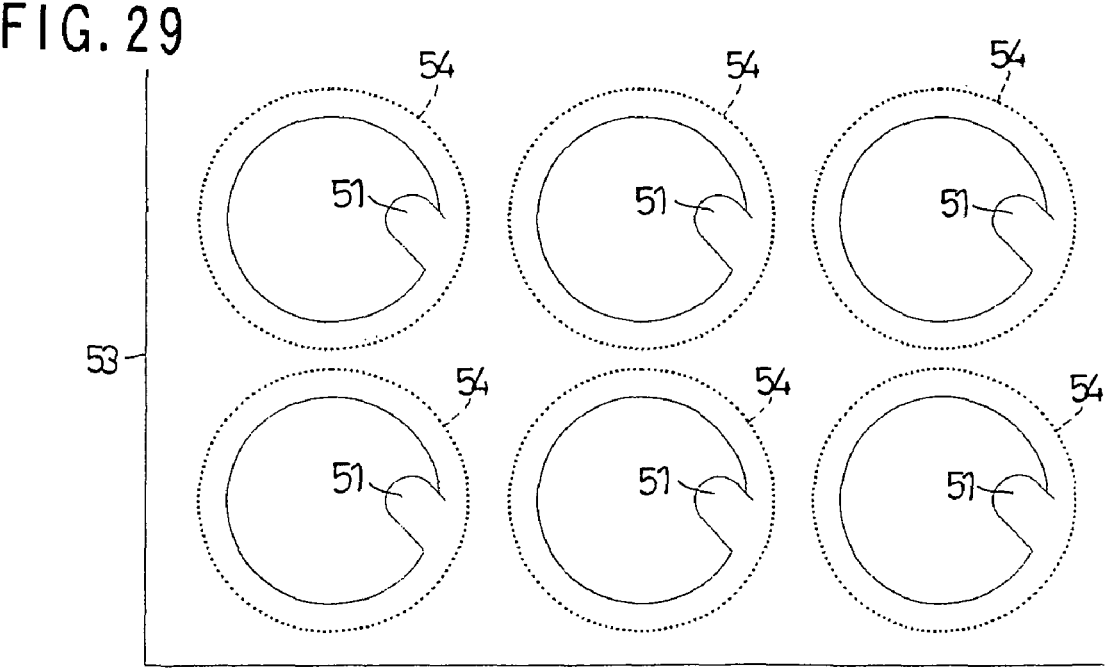
FIG. 29 is a plan view showing another production example of the peeling film.

In case that this easy-open sealed container is manufactured by the container maker, the sealed containers may be manufactured one by one as described above. However, in this case, much cost is required. Therefore, about 10 containers in one line are molded from a web sheet by a molding machine, and thereafter trimming is performed line by line by a trimming machine. Utilizing that the molded container comes out in the upside-down state, between this molding machine and the trimming machine, the broken portions 19 are formed in the flange portions 12 of the molded containers by an apparatus which forms ten broken portions 19 in one line. Ten perforations in one line are punched in a material rolled sheet for the peeling film 53 by a punching machine (square type in FIG. 28, circular type in FIG. 29). As the pack container 11 which has been molded and has the formed broken portion goes, the peeling film 16 is fitted into the pack container 11. Further, after the molded goods and the peeling film 16 have been integrated by the heater, the molded sheet and the peeling film 16 are sheared together by a shearing machine, whereby the pack containers can be mass-produced at a low cost. Reference numeral 54 represents an expected cut line. However, in case that the peeling-start portion 21, 41 exists outside the flange portion 12, shearing dimension is different between the pack container 11 and the peeling film 16. Therefore, it is very difficult technically to shear the pack container 11 and the peeling film 16 together. However, in case of the inner peeling-start portion 31, 51, since the shearing dimension is the same between the pack container 11 and the peeling film 16, it is easy to shear the packed container 11 and the peeling film 16 together. Further, since it is not necessary to change the shearing mold, this sealed container has an advantage that is can be manufactured at the lower cost.

In case that the plane shape of the opening portion of the pack container is tetragonal like the pack container 11 in the first embodiment, and the broken portion 19 is formed on two sides, three sides, or four sides of the tetragonal flange portion, not only the peeling film bonded onto the lower surface of the flange portion 12 is formed by the integrated matter having nearly the same shape as the shape of the two sided-, three sided-, or four sided-broken portion of the flange portion, but also the peeling film may have the constitution in which the peeling films are bonded onto respective sides. In this case, as a peeling film 76 bonded onto the lower surface of the flange portion 12, a linear tape which is individually bonded onto each side of the two sides, the three sides, or the four sides is used.

FIGS. 31 to 36 show a second embodiment of the invention, in which the linear tape is used. In the example shown in FIGS. 31 to 36, similarly to the example shown in FIG. 1, the invention is applied to a pack container 11 in which the plane shape of its opening portion is tetragonal, and a broken portion 19 is formed in all of the four sides of the flange portion 12. Further, a sealing film 15 and other same components as those which have been described in the example of FIG. 1 are denoted by the same reference numerals, and their detailed description is not repeated.

Figure 33:
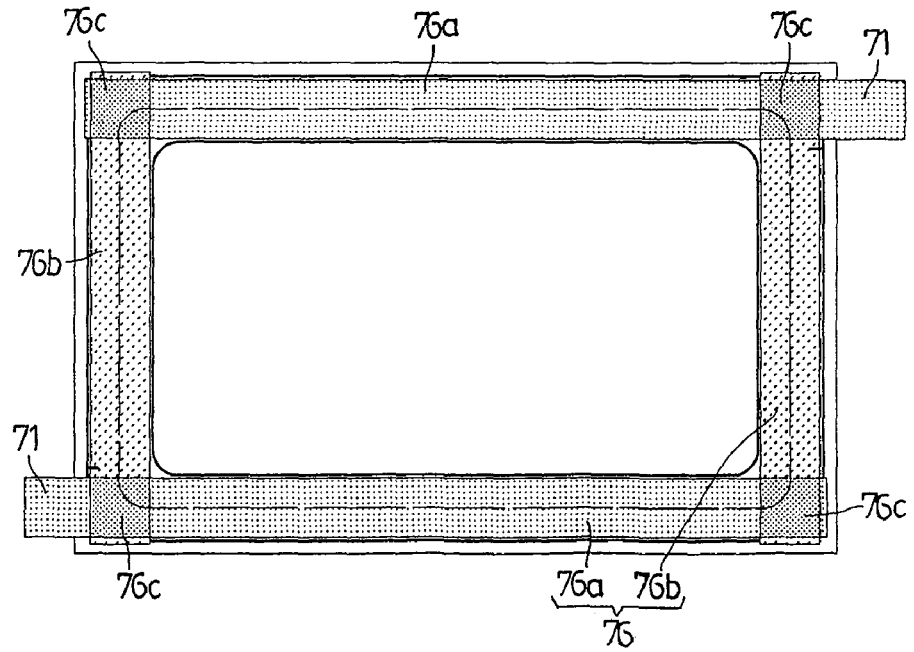
FIG. 33 is a bottom view of the same.

The illustrated peeling film 76 includes a long linear film 76a which is firstly bonded and a short linear film 76b which is secondarily bonded, which have double sided-adhesivity. Their long and short linear films 76a and 76b are bonded onto the lower surface of the flange portion 12, extending to both of an inner portion 13 and an outer portion 14. The long and short linear films 76a and 76b are arranged in parallel crosses. In FIG. 33, the long linear film 76a, the short linear film 76b, and a cross portion 76c in which their films 76a and 76b are overlapped are shown with patterns different from one another.

The illustrated long linear film 76a is cut with such a length that the film 76a protrudes outward of the flange portion 12. The linear film 76a provided with a peeling-start portion 71, after being bonded onto the flange portion 12, is cut in a position of the outermost portion of the flange portion 12. In the manufacturing process, the pack containers 11 are provided with space corresponding to the length of the peeling start portion, and the peeling-start portion 71 having the protruding length corresponding to the above space is provided. Further, the peeling film 76 that is also used as a reinforcement tape covers completely a cut-off line 19a of a broken portion 19.

Which of the long linear film 76a and the short linear film 76b that constitute the peeling film 76 should be firstly bonded is determined by selection. According to a result of that selection, which of the long linear film 76a and the short linear film 76b the peeling start portion 71 should be provided for, how the direction of the peeling-start portion 71 changes, or how many peeling-start portions 71 should be provided in a range of one to eight can be set.

Figure 34:
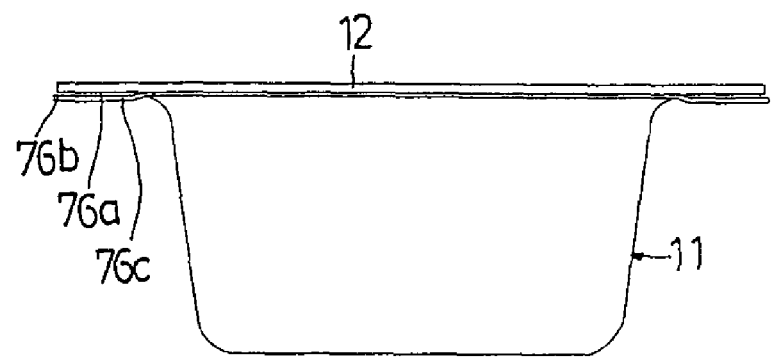
FIG. 34 is a side view showing an overlapping state of films.
Figure 35:
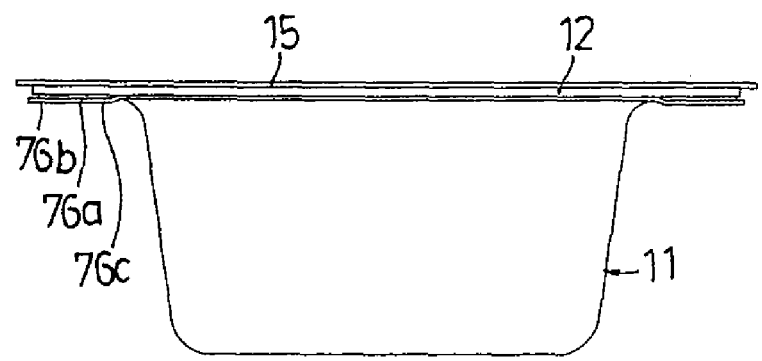
FIG. 35 is a side view in a state where a sealing film is bonded.

In the overlapped portion of the long linear film 76a and the short linear film 76b, difference in level is inevitable. Refer to FIGS. 34 and 35. However, since the thickness of the film is thin, for example, 0.04 to 0.05 mm (40~50μ), and pressure is applied by the bonding heater, the film itself in case that the film is formed of thermal welding resin, and an adhesive in case that the adhesive sticks to the film formed of resin that has no thermal welding property, respectively start to fuse and fill clearance. In result, the pack container is put in the sealed state, and there is no fear that liquid will leak out.

Figure 36:
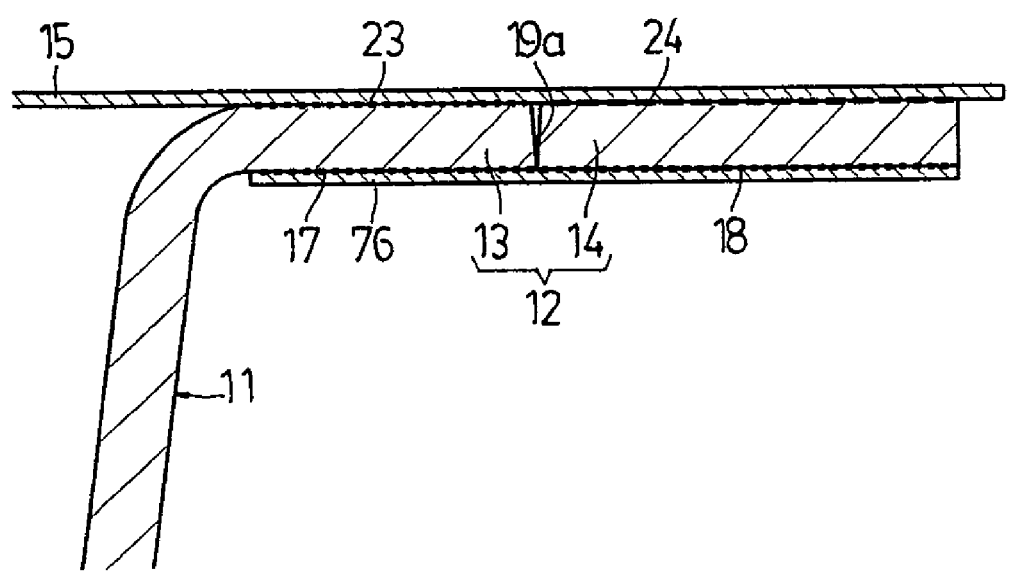
FIG. 36 is a sectional view showing a main portion in enlargement.

The sealed container thus formed by bonding, onto the flange portion 12 of the pack container 11, the seal film 15, and the peeling film 76 including the long linear film 76a and the short linear film 76b has, as shown in FIG. 36, the nearly similar structure to that of the representative example shown in FIG. 1. Namely, the seal film 15 and the peeling film 76 are bonded onto the upper and lower surfaces of the flange portion 12 respectively at two portions of the inner portion 13 and the outer portion 14 in the broken portion 19, that is, at four portions in total. In the first embodiment, of their four bonding portions, only the outer bonding portion 24 of the seal film 15 has strong bonding power, and all of the others have weak bonding power. Three weak bonding areas and one strong bonding area balances the whole, so that the sealed state can be maintained.

Figure 37:
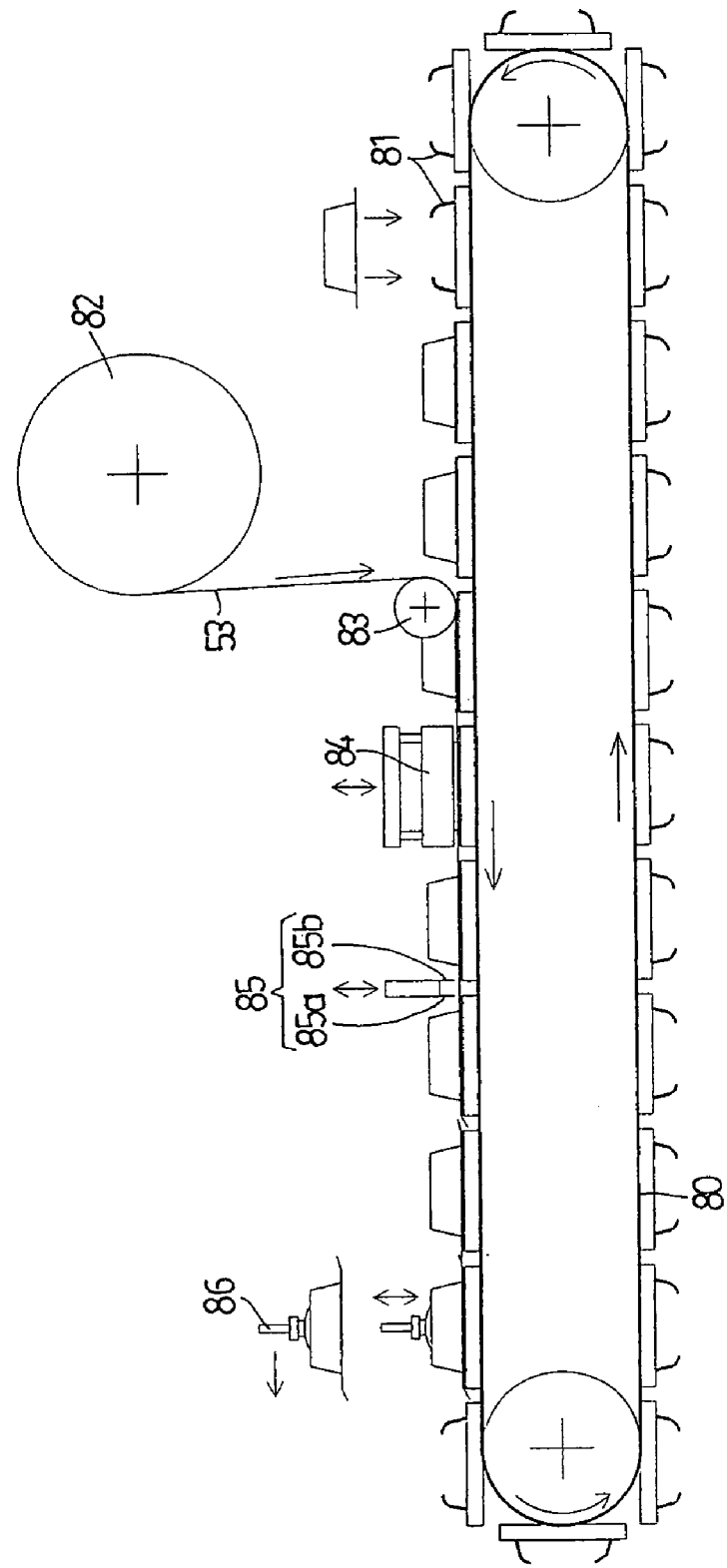
FIG. 37 is a sectional explanatory view showing a manufacturing apparatus of the sealed container.

FIG. 37 shows an apparatus of manufacturing the sealed container in the second embodiment which is shown in FIGS. 31 to 36. This apparatus performs the necessary bonding operation in the process of feeding the pack container 11 by a conveyor 80. In order to bond the long linear film 76a and the short linear film 76b, two front and back conveyors are used.

In FIG. 37, a reference numeral 81 is a pack container positioning fitting which is attached onto the conveyor, into which the pack container 11 in which the seal film 15 has been previously attached is attached upside down. A reference numeral 82 is a film bobbin, which supplies the film 53, for example, as the long linear film 76a. In this case, the short linear film 76b is bonded in a not-shown second conveyor. A reference numeral 83 is a tape guide roller, and 84 is a film bonding heater, which is set in the fixed position and pressurizes the peeling film 76 onto the lower surface of the flange portion 12 by up-and-down operation. FIG. 30 which has been described before shows this portion in detail. A reference numeral 85 is a vertical motion type film cutter, and includes a front cutter 85*a* and a back cutter 85*b*. A reference numeral 86 is a pack container absorber, which detaches the pack container 11 which has completed film-bonding from the positioning fittings 81.

Figure 38:
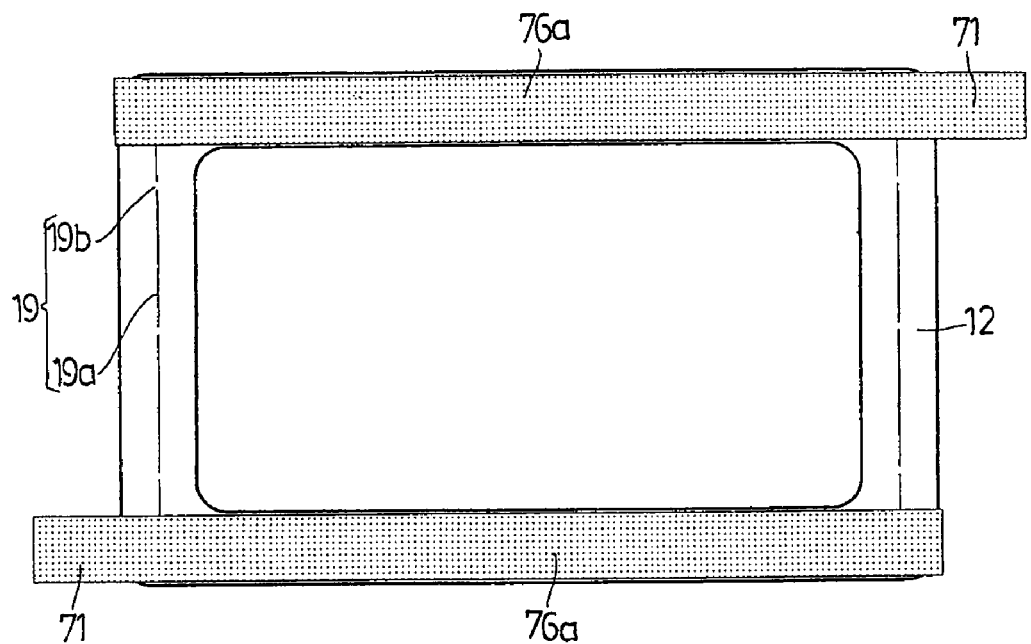
FIG. 38 is a bottom view of the sealed container onto which long linear films are bonded.

In this apparatus, when the pack container 11 is attached in the positioning fittings 81, the conveyor 80 operates, and the pack container 11 moves to the tape guide roller 83, the film 53 is led to the flange portion 12, and heated and pressurized by the film bonding heater 84, whereby the long linear film 76*a* is bonded onto the lower surface of the flange portion 12 (FIG. 38). By first bonding, the film 53 is fed out with feeding of the pack container 11 by the conveyor 80, and the bonded film 53 is arranged with the necessary extruding length for the peeling-start portion 71 and cut by the front cutter 85*a* and the back cutter 85*b*. After completion of film 53 cutting, the pack container 11 is put in a state shown in FIG. 38. This pack container 11 is moved to the not-shown second conveyer by the pack container absorber 86.

Figure 39:
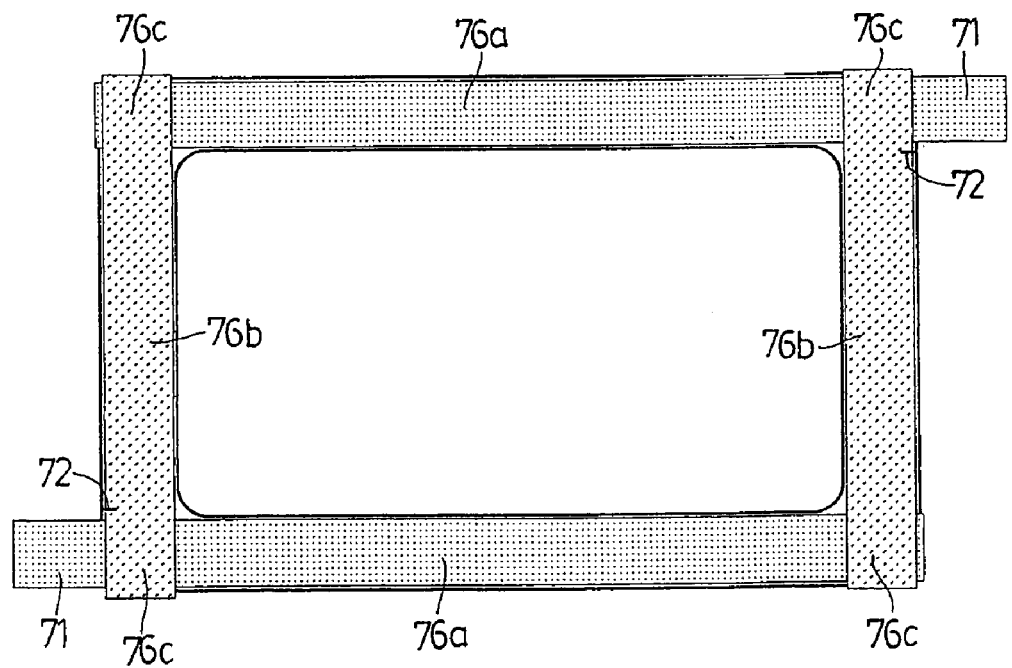
FIG. 39 is a bottom view-of the sealed container onto which short linear films are further bonded.

The second conveyer has the nearly same constitution as that of the first conveyer, and is used to bond the short linear film 76*b* (FIG. 39). As an arrangement form of the second conveyer in relation to the first conveyer 80, two kinds of forms can be selected: a form in which the second conveyer is arranged in the same conveying direction; and a form in which the second conveyer is arranged in the orthogonal conveying direction. In case of the same conveying direction, the pack container 11 must be turned at 90°. However, in case of the orthogonal conveying direction, the pack container 11 can be supplied in the same direction. In the second conveyer, only one film cutter 85 is required, the pack containers 11 are conveyed closely so as to come into contact with each other back and forth, and a cutter is provided in order to form a I-notch shaped cut portion 72 in a root of the film that is located on the upside at the cross portion 76*c* (in this example, root of the short linear film 76*b*).

Figure 40:
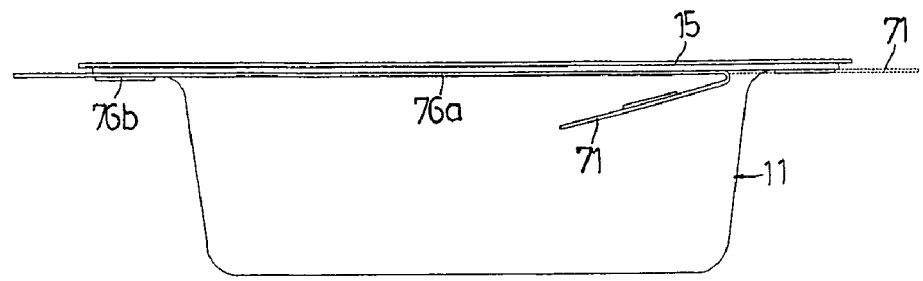
FIG. 40 is a front view showing a peeling-start state of a peeling film.
Figure 41:
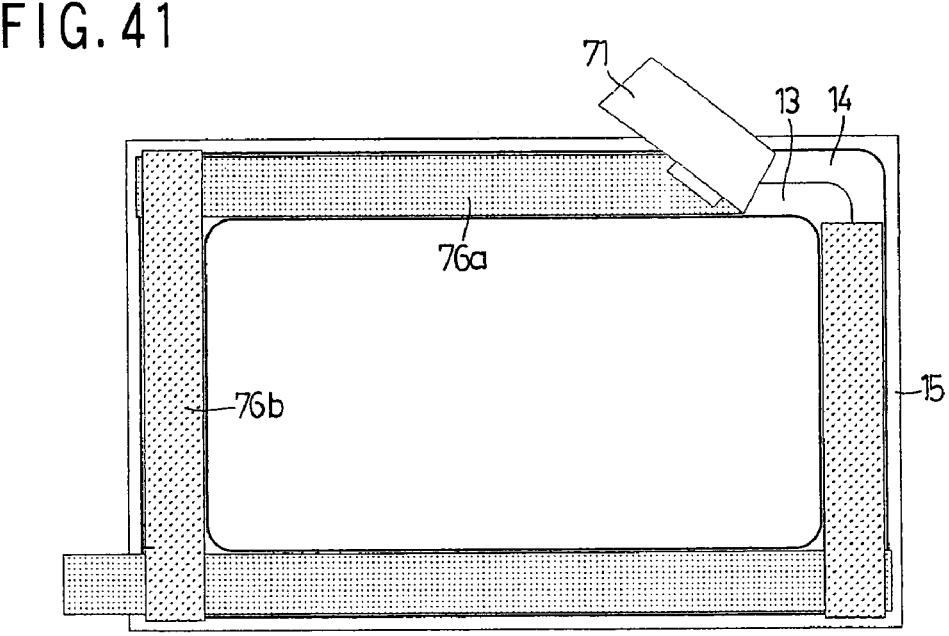
FIG. 41 is a bottom view of the same.
Figure 42:
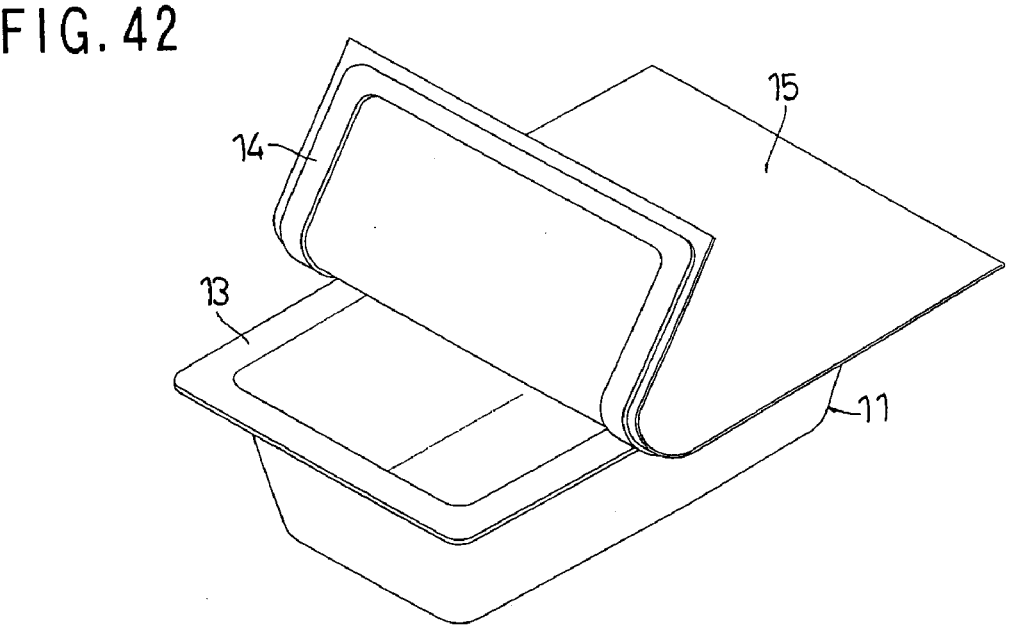
FIG. 42 is a perspective view showing a peeling-start state of the seal film.

In the example shown in FIGS. 31 to 36, it is desirable that: in case that the long linear film 76*a* is thin in thickness, for example, 0.04 to 0.05 mm (40 to 50 t), the short linear film 76*b* is thicker in thickness by about one figure, for example, 0.5 to 0.6 mm (500 to 600μ). Thus, as shown in FIG. 39, from the peeling-start portion 71, the peeling film can be peeled with the I-notch shaped cut portion 72 as a start (FIG. 40*I*). Namely, the long linear film 76*a* is peeled from the lower surface of the flange portion 12, and the short linear film 76*b* that connects to the long linear film 76*a* at the cross-portion 76*c* is similarly peeled (FIG. 41). At this time, the pack container 11 is not cut. After the peeling film 76 is peeled, the seal film 15 bonded onto the upper surface of the flange portion 12 will be peeled. At this time, since the seal film 15 is bonded strongly to the outer portion 14 of the flange portion 12, by peeling only the weak bonding at the inner portion 23, the seal film 15 can be readily removed (FIG. 42).

Figure 43:
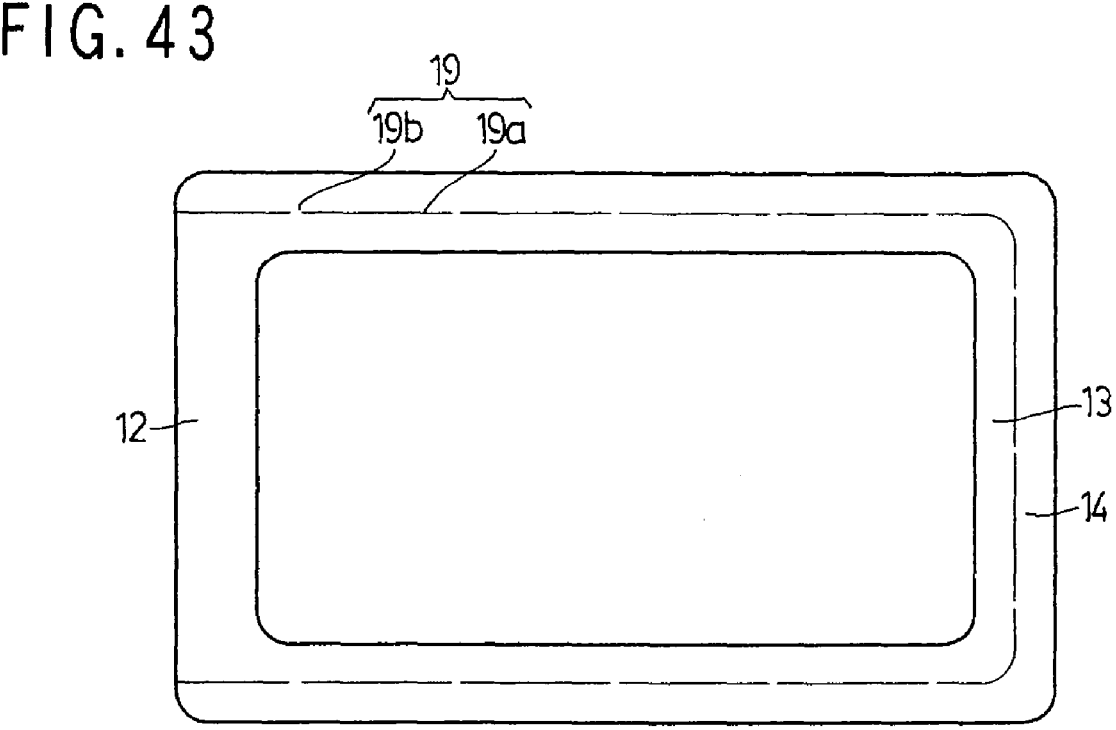
FIG. 43 is a plan view showing a C-shaped broken portion in the second embodiment.
Figure 44:
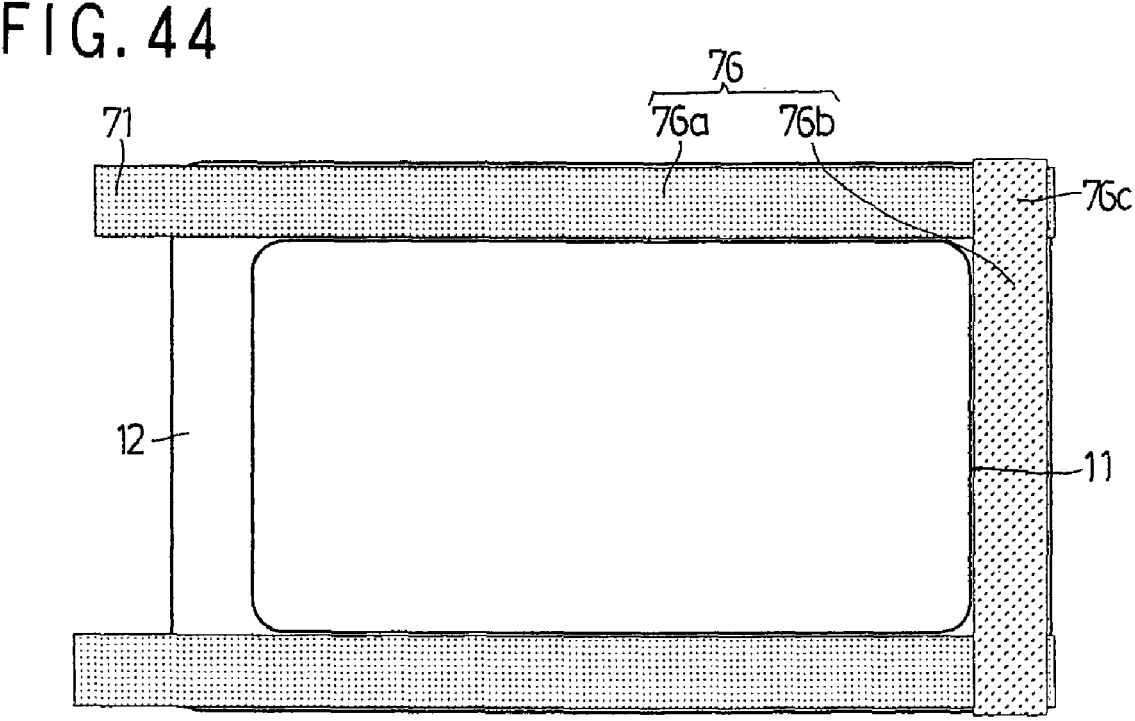
FIG. 44 is a bottom view of the same in a state where the peeling film is bonded.

FIGS. 43 and 44 show an example in which as a reinforcement film bonded onto the lower surface of the flange portion 12 in case that the broken portion 19 is formed on three sides of the four sides of the flange portion, the peeling film 76 is bonded onto the respective sides of the three-sided broken portion 19 of the flange portion 12. In this example, onto the flange portion 12, the peeling film 76 including two pieces of long linear films 76*a* and the short linear film 76*b* is bonded in the C-shape. One end of each of the two pieces of long linear films 76*a* is protruded from the flange portion 12 thereby to provide the peeling start-portion 71. Since other components are the same as those in the example shown in FIGS. 31 to 36, they are denoted by the same reference numerals, and their detailed description is omitted.

Figure 45:
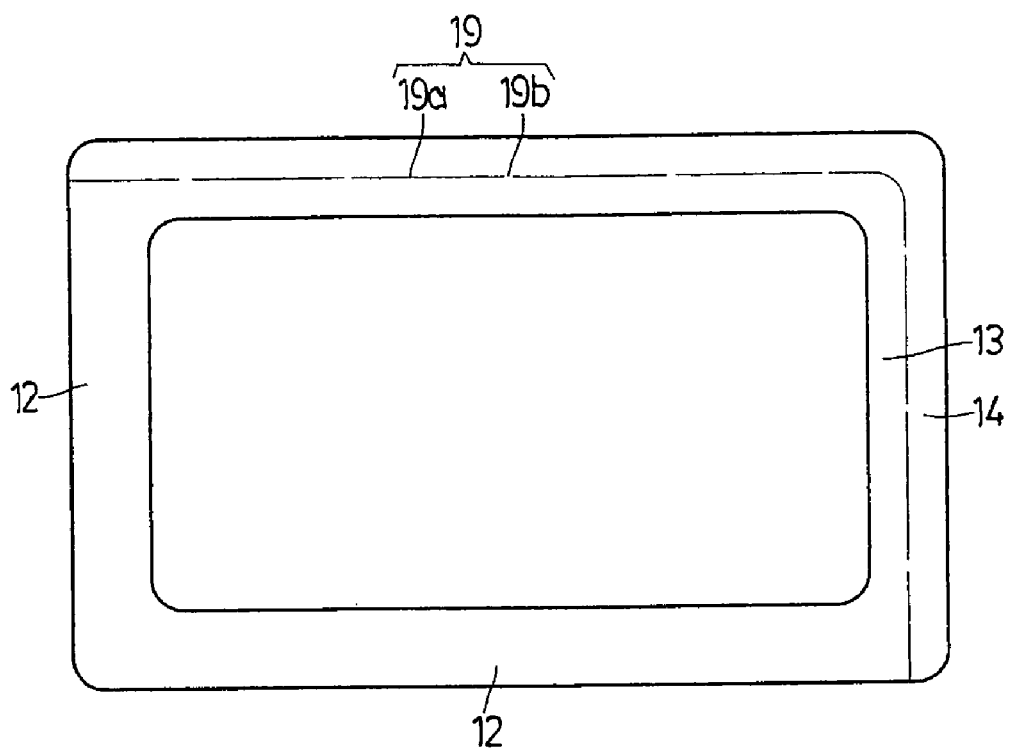
FIG. 45 is a plan view showing an L-shaped broken portion in the second embodiment.
Figure 46:
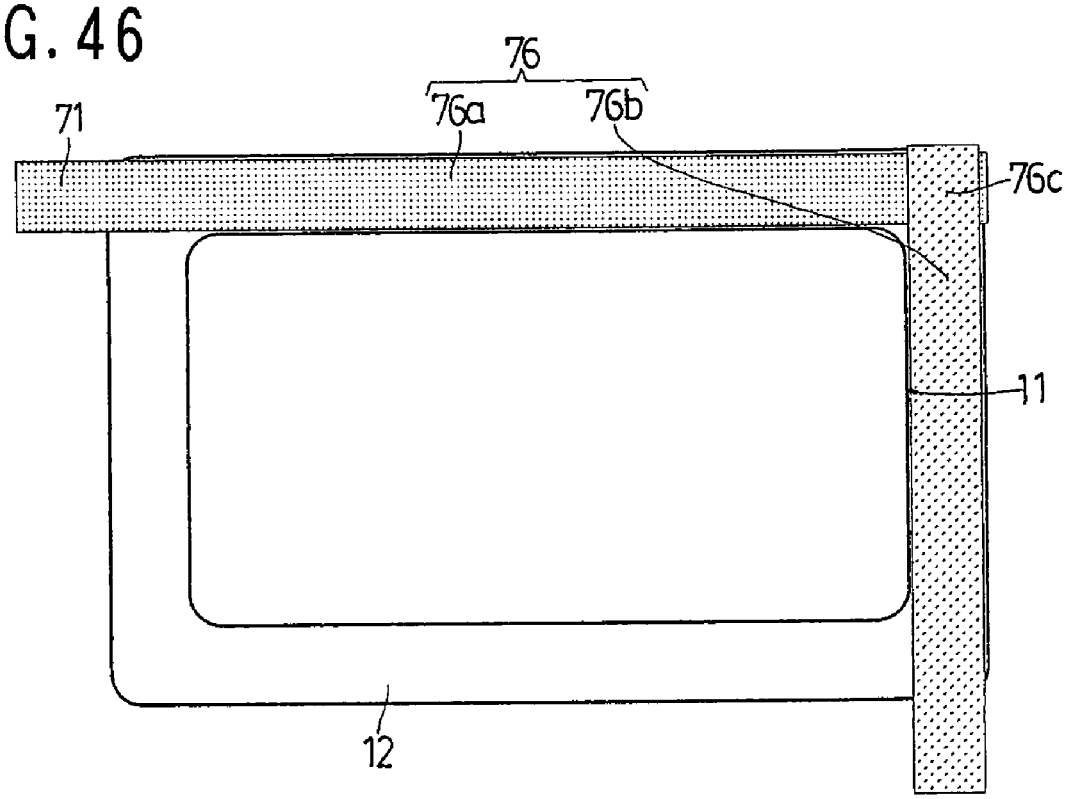
FIG. 46 is a bottom view of the same in the state where the peeling film is bonded.

FIGS. 45 and 46 show an example in which as a reinforcement film bonded onto the lower surface of the flange portion 12 in case that the broken portion 19 is formed on two sides of the four sides of the flange portion, the peeling film 76 is bonded onto the respective sides of the two-sided broken portion 19 of the flange portion 12. In this example, onto the flange portion 12, the peeling film 76 including the long linear film 76*a* and the short linear film 76*b* is bonded in the L-shape. One end of each of the long linear films 76*a* is protruded from the flange portion 12 thereby to provide the peeling start-portion 71. Since other components are the same as those in the example shown in FIGS. 31 to 36, they are denoted by the same reference numerals, and their detailed description is omitted.

The apparatus used to manufacture the pack containers in the examples shown in FIGS. 43, 44, 45 and 46 is similar to the apparatus shown in FIG. 30 or FIG. 37, and the manufacturing method is also similar, except that the bonding portions of the long linear film 76*a* and the short linear film 76*b* on the flange portion 12 are few. Therefore, even if the pack containers in FIGS. 43, 44, 45 and 46 are not described in detail, they can be readily worked with reference to the before-mentioned description. However, when bonding the seal film 15 and the peeling film 16, 76 onto the flange portion 12 by means of the inner bonding first heater 63 and the outer bonding second heater 64 as shown in FIG. 30, in the case where the sealing degree is not very important and the easiness for opening the sealed container is more important than the sealing degree, the low-temperature weak bonding first heater 63 can be omitted.

In the above examples, in case that the pack container 11 is tetragonal, while the example in which the broken portion 19 is provided in all of the four sides of the flange portion 12 has been centrally described, the example in which the broken portion 19 is provided in the three sides of the flange portion 12 of the pack container 11 nearly in the C-shape has been described with reference to FIG. 17, and the example in which the broken portion 19 is provided in the two sides of the flange portion 12 of the pack container 11 nearly in the L-shape has been described with reference to FIG. 18. However, the form which the broken portion 19 can take in order to unseal the seal film 15 is not limited to the above examples, and various modifications can be made. Their modified examples will be described with reference to FIGS. 47 to 62. In these examples, a broken portion 19 can take the constitution which includes long cut-off lines 19*a* and a short connection portion 19*b* arranged between the long cut-off lines 19*a*, or the constitution which includes only the cut-off lines 19*a*, which is similar to that in the above examples.

Figure 47:
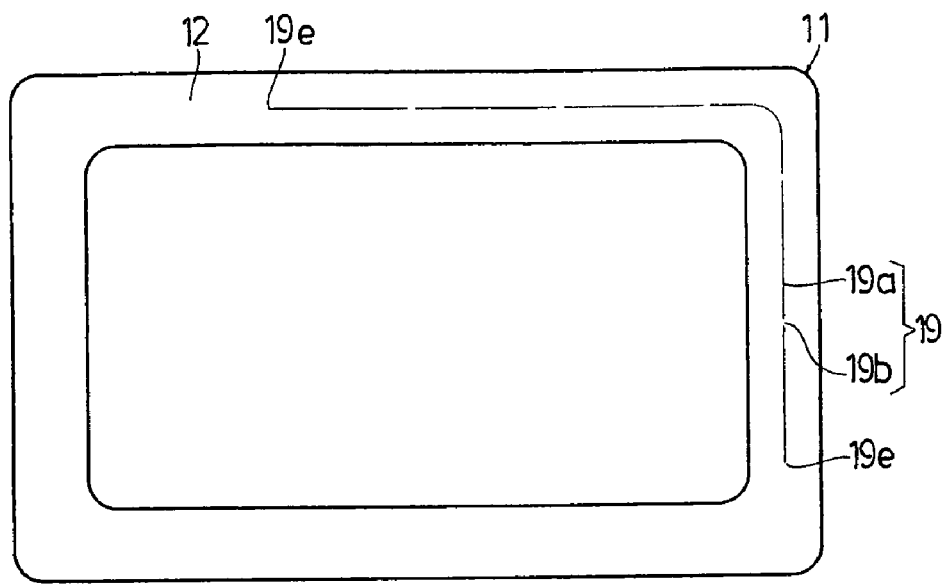
FIG. 47 is a plan view showing a modified example of the broken portion provided in the pack container.
Figure 48:
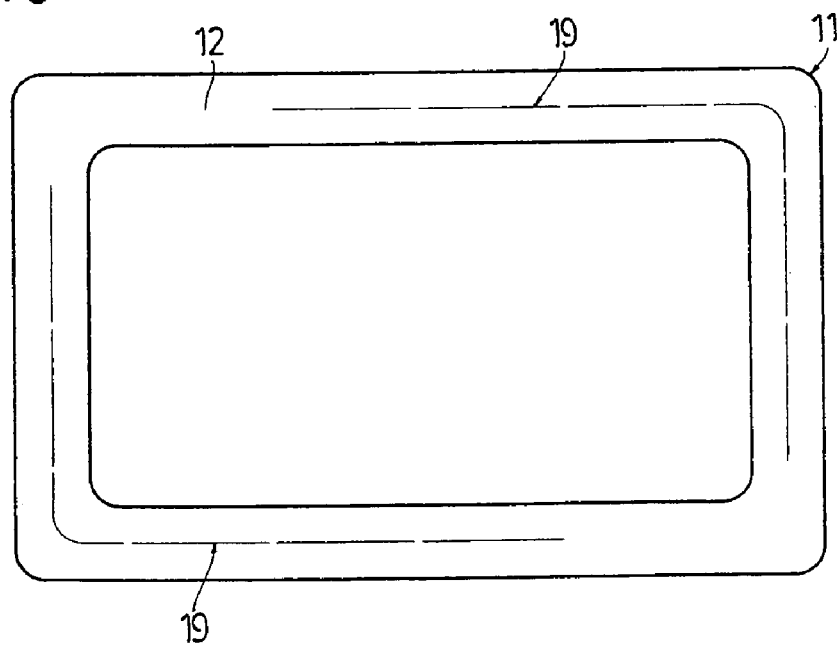
FIG. 48 is a plan view showing an example in which two sets of the broken portions in FIG. 47 are provided.
Figure 49:
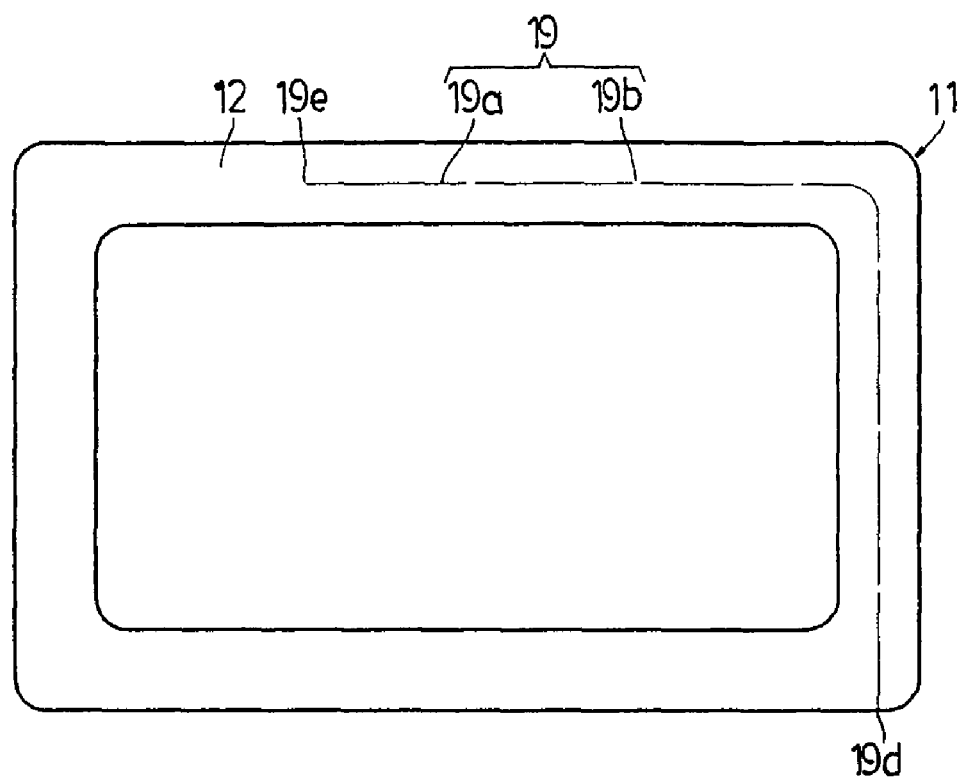
FIG. 49 is a plan view showing a modified example of the broken portion provided in the pack container.
Figure 50:
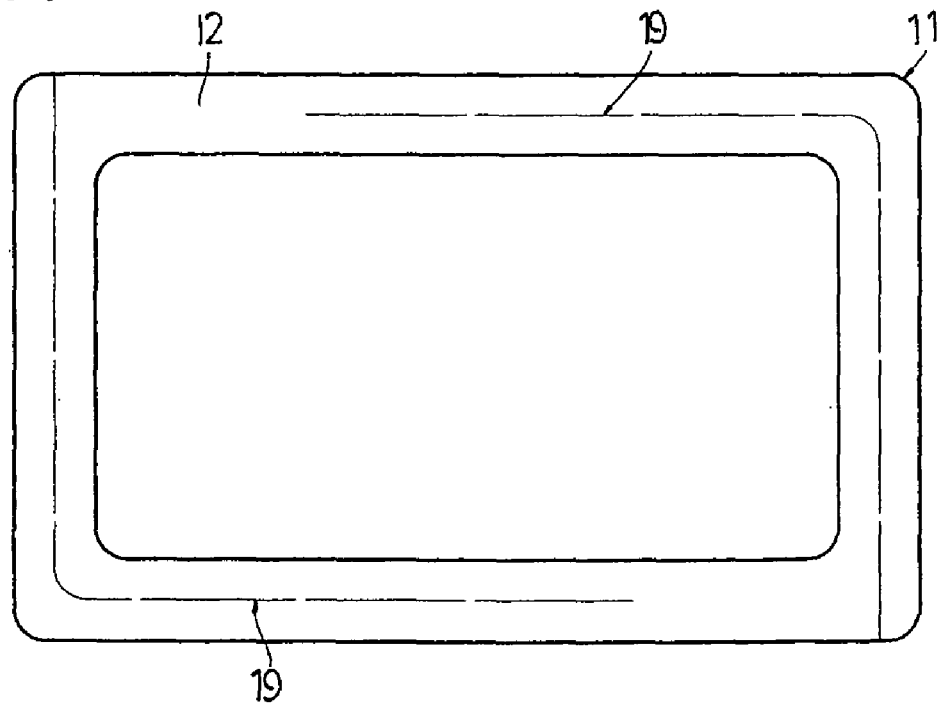
FIG. 50 is a plan view showing an example in which two sets of the broken portions in FIG. 49 are provided.

FIG. 47 shows an example in which a broken line 19 both ends 19*e* of which are located in a flange portion 12 is provided in two sides of the flange portion 12 of a pack container 11 nearly in the L-shape. FIG. 48 shows an example in which two sets of the nearly L-shaped broken portions 19 in FIG. 47 are provided in point-symmetry. In case of these examples, though only a part of the seal film 15 is unsealed, in case that the contents filled in the pack container 11 has a flowable nature, even partial unsealing of the seal film 15 makes it possible to completely take the contents out of the pack container 11. FIGS. 49 and 50 show examples in which only one end 19*e* of the L-shaped broken line 19 is located in the flange portion and the other end 19d thereof reaches the outer side of the flange portion 12 at a corner of a tetragon.

Figure 51:
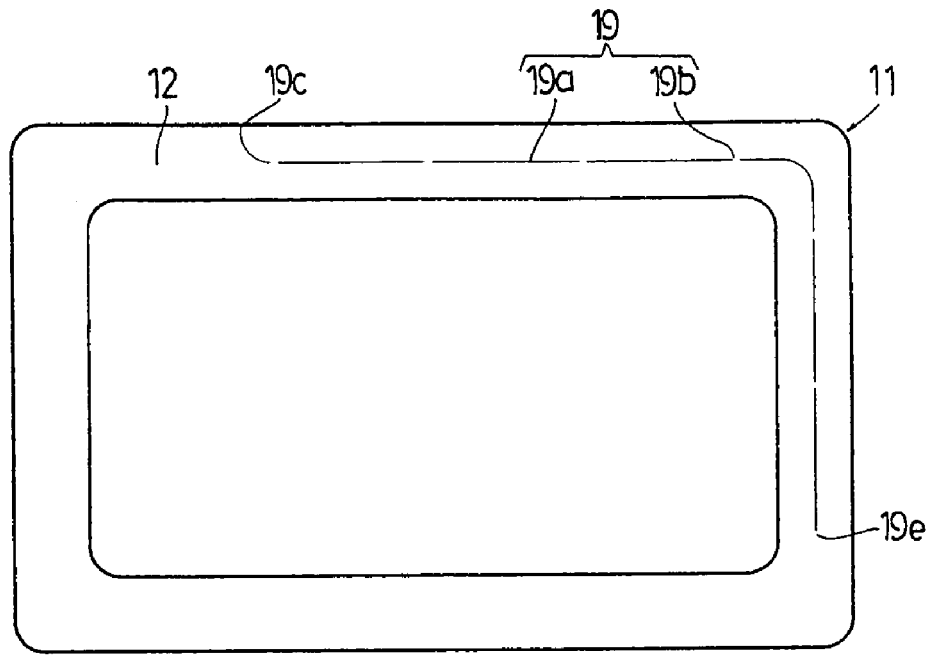
FIG. 51 is a plan view showing a modified example of the broken portion provided in the pack container.
Figure 52:
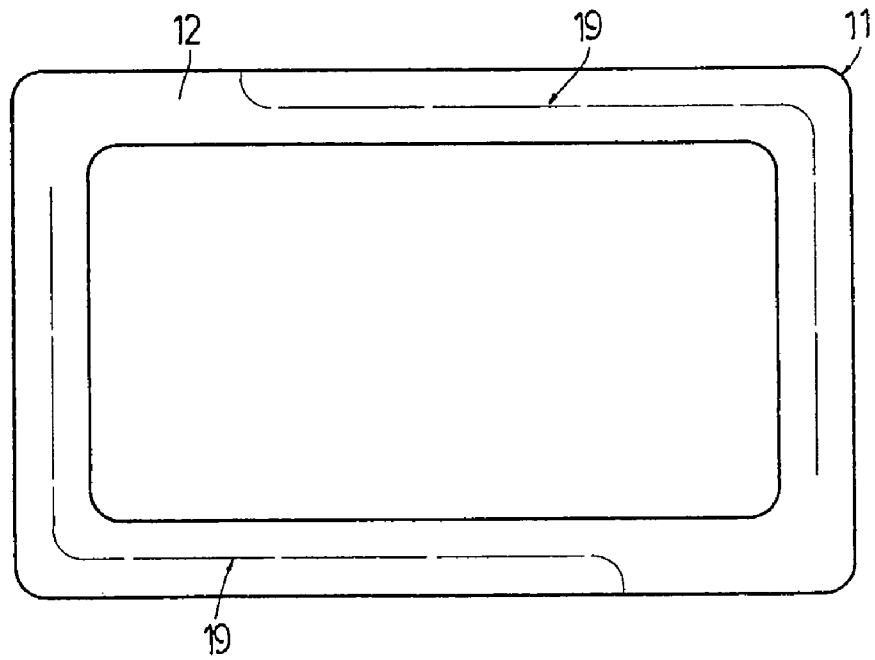
FIG. 52 is a plan view showing an example in which two sets of the broken portions in FIG. 51 are provided.
Figure 53:
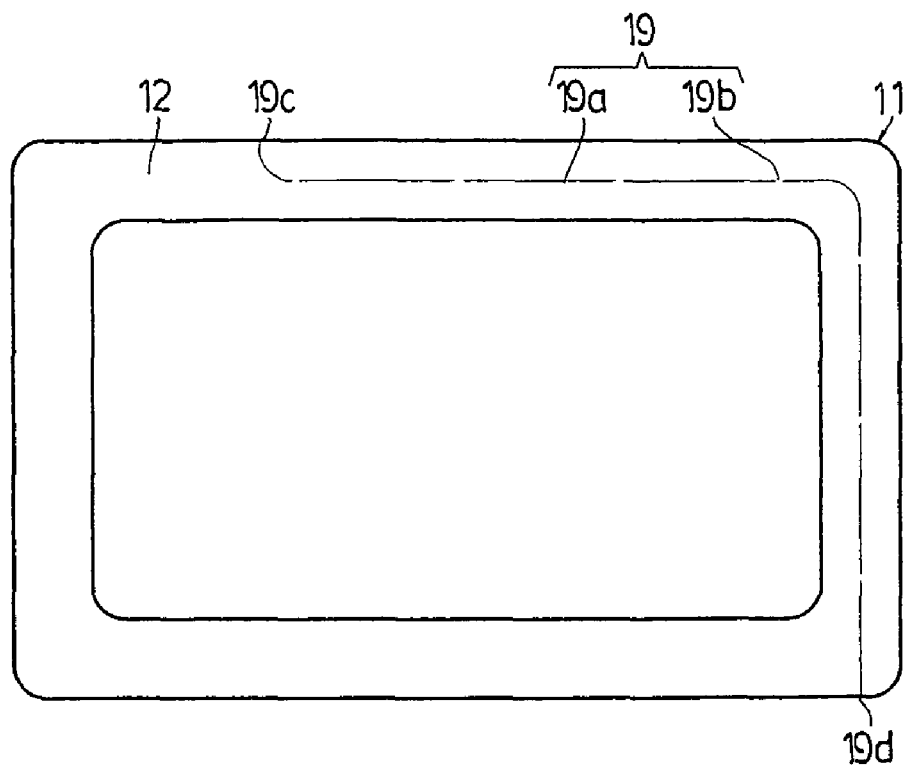
FIG. 53 is a plan view showing a modified example of the broken portion provided in the pack container.
Figure 54:
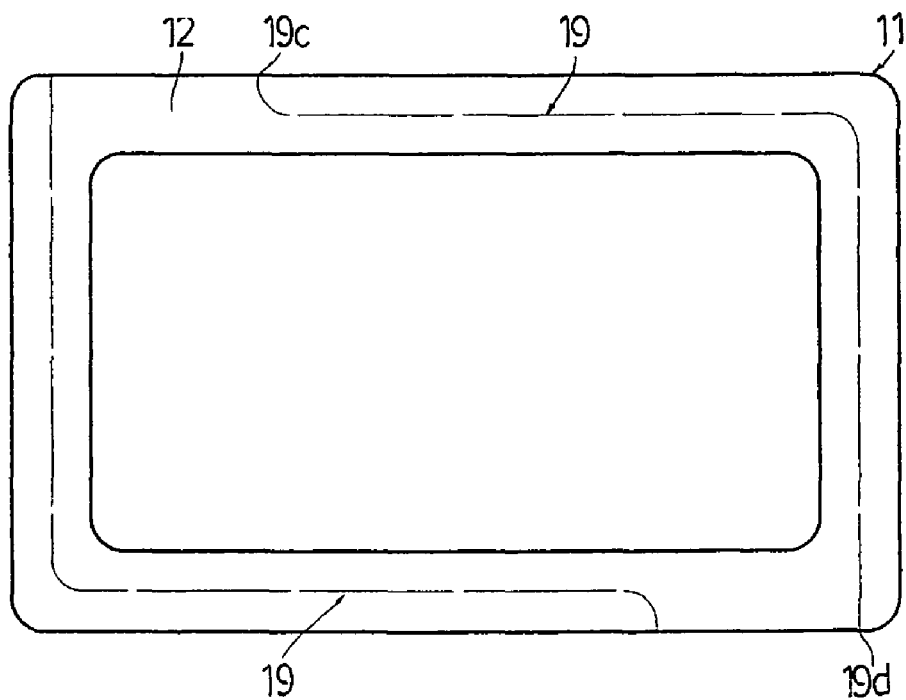
FIG. 54 is a plan view showing an example in which two sets of the broken portions in FIG. 53 are provided.
Figure 55:
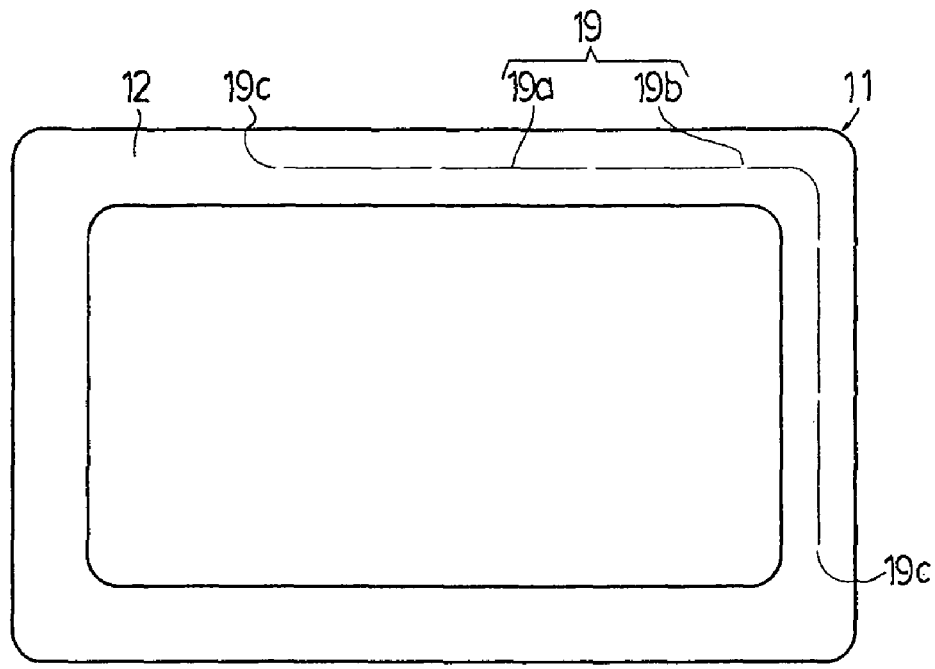
FIG. 55 is a plan view showing a modified example of the broken portion provided in the pack container.
Figure 56:
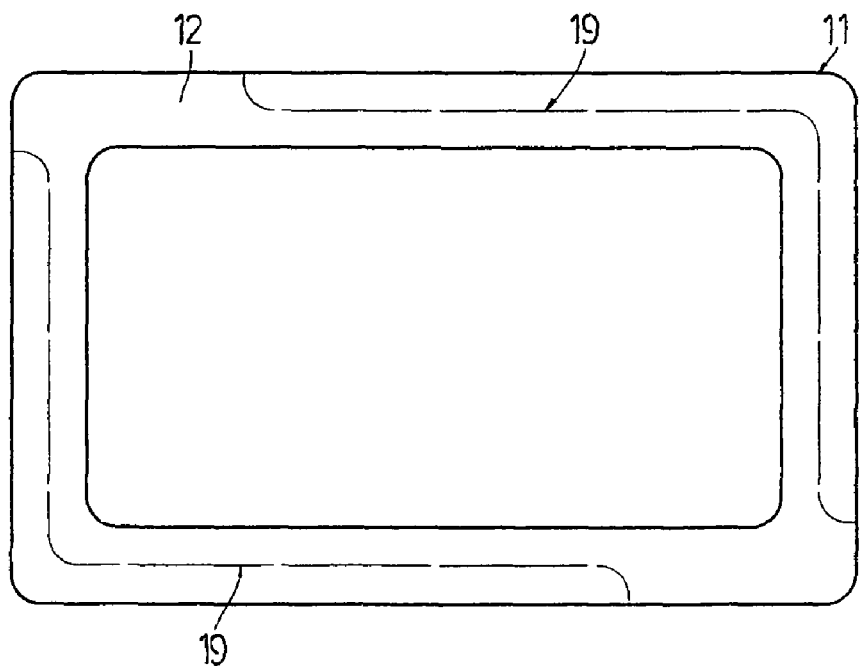
FIG. 56 is a plan view showing an example in which two sets of the broken portions in FIG. 55 are provided.

FIG. 51 shows an example in which a broken line 19 both ends 19e of which are located in a flange portion 12 is provided in two sides of the flange portion 12 of a pack container 11 nearly in the L-shape, and one end 19c of the L-shaped broken line 19 reaches the outer side of the flange portion 12 midway of a side of the flange portion 12. FIG. 52 shows an example in which two sets of the nearly L-shaped broken portions 19 in FIG. 51 are provided in point-symmetry. FIGS. 53 and 54 show examples in which one end 19c of an L-shaped broken line 19 reaches the outer side of the flange portion 12 midway of a side of the flange portion 12, and the other end 19d thereof reaches the outer side of the flange portion 12 at a corner of a tetragon. Further, FIG. 55 shows an example in which a broken line 19 both ends 19c of which are located in a flange portion 12 is provided in two sides of a flange portion 12 of a pack container 11 nearly in the L-shape, and both ends 19c of the L-shaped broken line 19 reach the outer sides of the flange portion 12 midway of sides of the flange portion 12. FIG. 56 shows an example in which two sets of the nearly L-shaped broken portions 19 in FIG. 55 are provided in point-symmetry.

Figure 57:
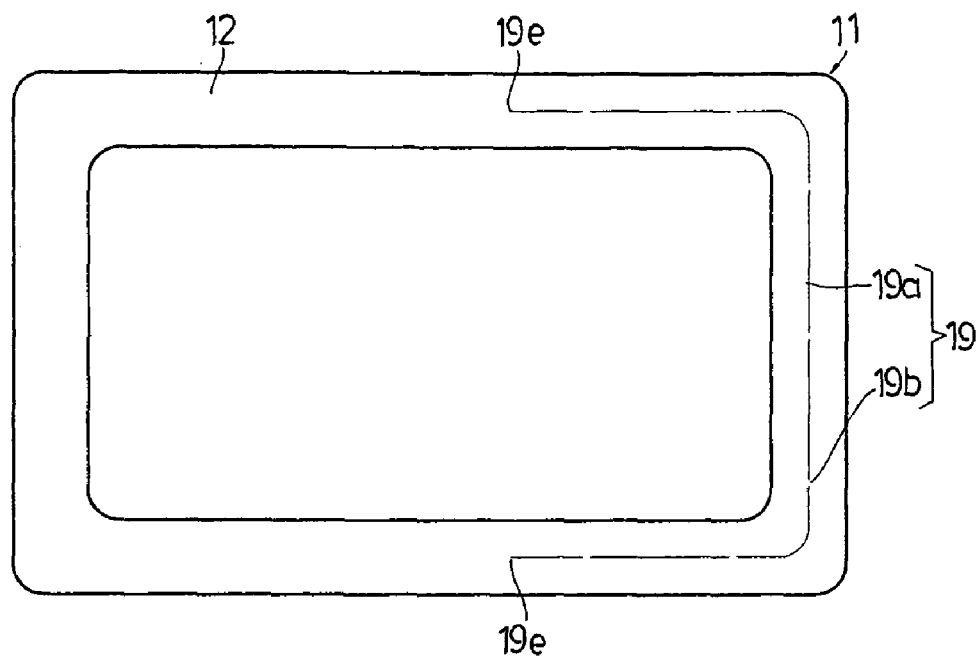
FIG. 57 is a plan view showing a modified example of the broken portion provided in the pack container.
Figure 58:
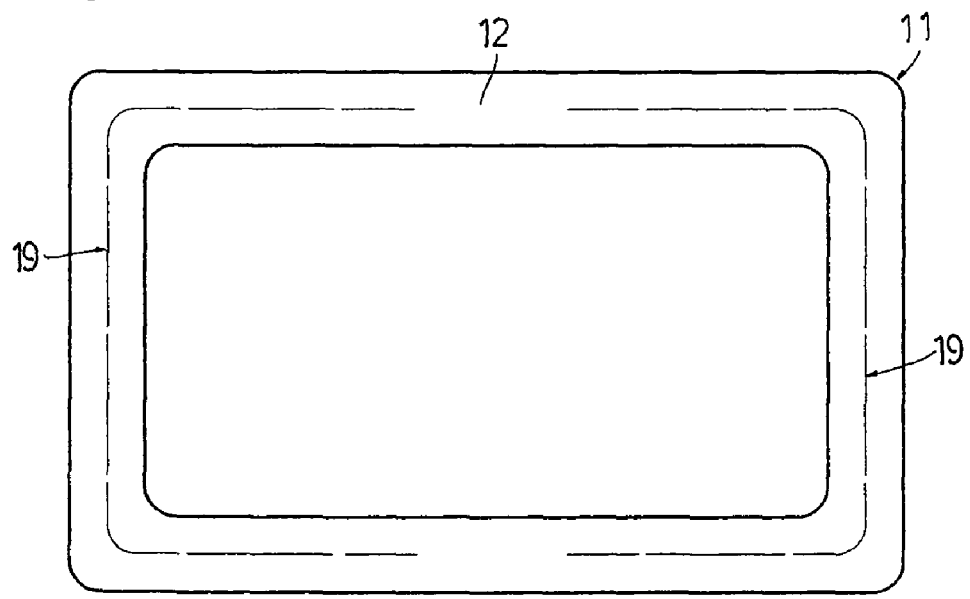
FIG. 58 is a plan view showing an example in which two sets of the broken portions in FIG. 57 are provided.
Figure 59:
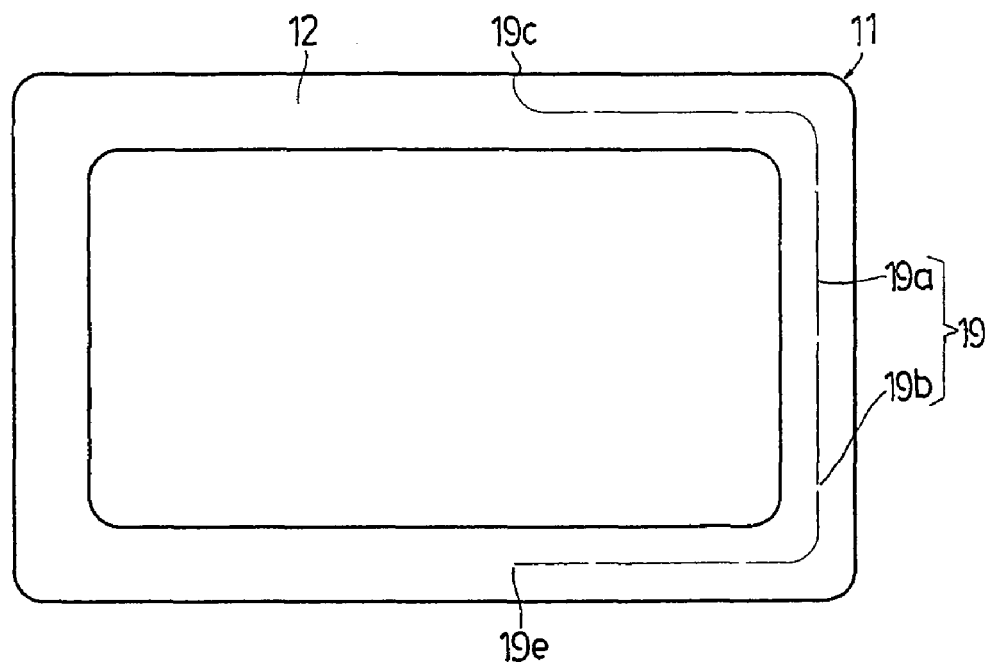
FIG. 59 is a plan view showing a modified example of the broken portion provided in the pack container.
Figure 60:
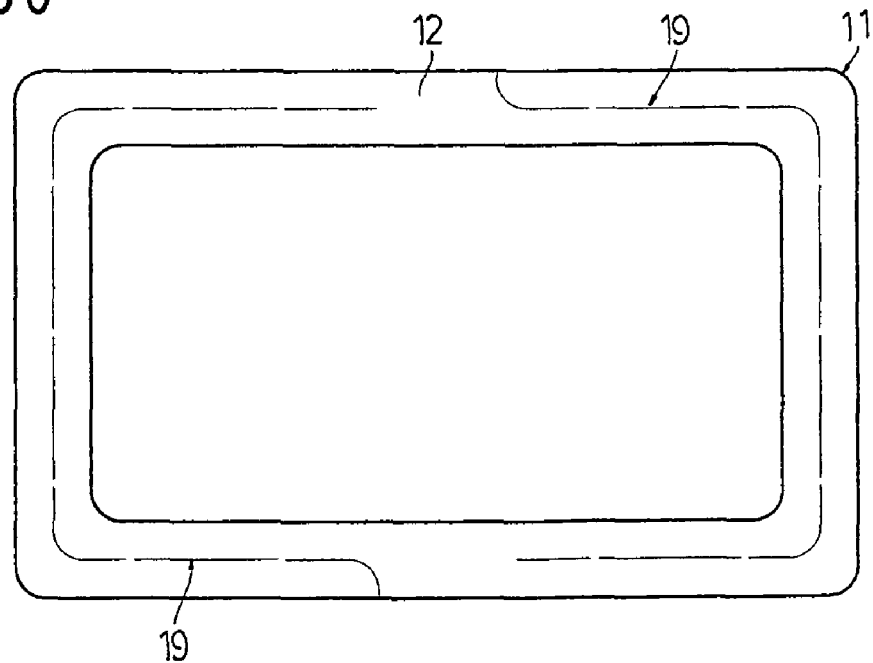
FIG. 60 is a plan view showing an example in which two sets of the broken portions in FIG. 59 are provided.
Figure 61:
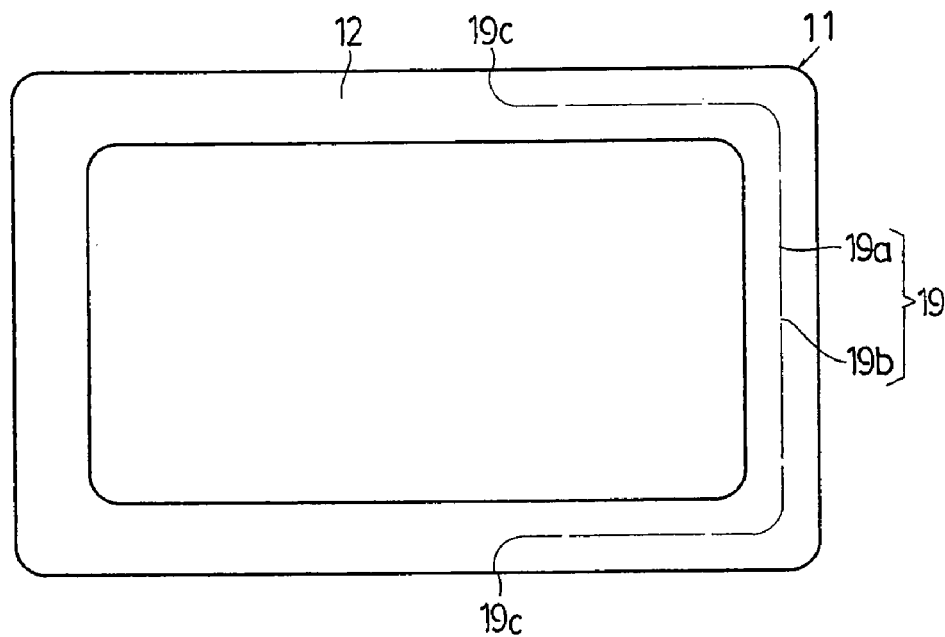
FIG. 61 is a plan view showing a modified example of the broken portion provided in the pack container.
Figure 62:
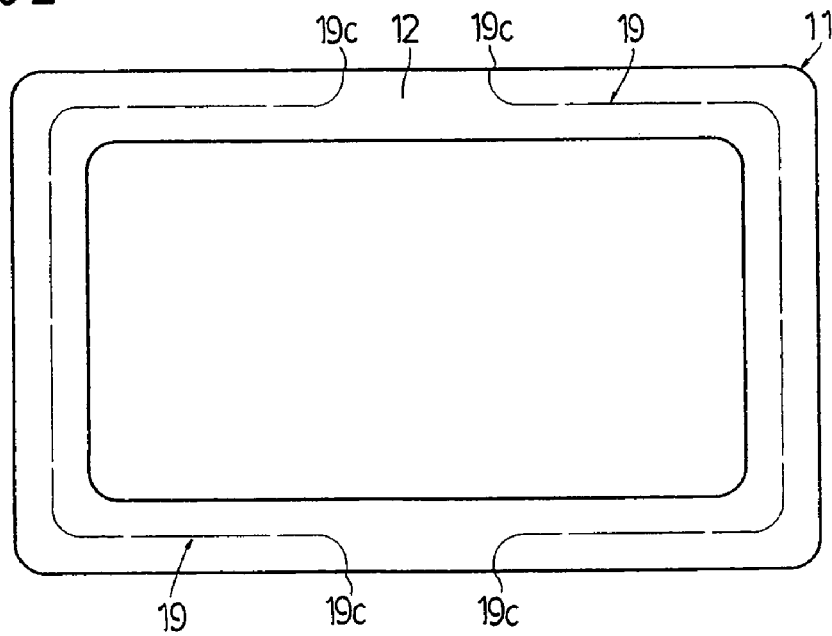
FIG. 62 is a plan view showing an example in which two sets of the broken portions in FIG. 61 are provided.

FIG. 57 shows an example in which a broken line 19 both ends 19e of which are located in a flange portion 12 is provided in three sides of the flange portion 12 of a pack container 11 nearly in the C-shape. FIG. 58 shows an example in which two sets of the nearly C-shaped broken portions 19 in FIG. 57 are provided in left-right symmetry. FIG. 59 shows an example in which only one end 19e of the nearly C-shaped broken line 19 is located in a flange portion 12 and the other end 19c thereof reaches the outer side of the flange portion 12 midway of a side of a tetragon. Further, FIG. 60 shows an example in which two sets of the nearly C-shaped broken portions 19 in FIG. 59 are provided in left-right symmetry. Further, FIG. 61 shows an example in which a broken line 19 extends to three sides of a flange portion 12 of a pack container 11, both ends of the C-shaped broken line 19 which are located in the two parallel sides of the flange portion 12 are located midway of the sides, and both ends 19c of the C-shaped broken line 19 reach the outer sides of the flange portion 12 midway of the sides. FIG. 62 shows an example in which two sets of the nearly C-shaped broken portions 19 in FIG. 61 are provided in point-symmetry. As long as the end of the broken line 19 is located in the flange portion, the broken line 19 is not completely cut off from the flange portion 12 after unsealing and remains attached to the flange portion 12. In this state, in case that the contents filled in the pack container is of a liquid-type, the contents can be taken out of the pack container without hindrance.

As described above, in the easy-open sealed container according to the invention, since the flange portion of the pack container is previously cut into the inner portion and the outer portion, any soft material can be used, and the sealed container can be similarly formed of even hard material. Further, the invention can be applied to not only the plastic container but also containers of every materials such as an aluminum foil container, a paper container, and a plywood container formed of wood.

What is claimed is:

1. An easy-open sealed container comprising:
a flange portion surrounding an opening portion of a plastic pack container, the flange portion comprising a broken portion including a cut-off line and a connection part formed in a part or a whole of the flange portion, the flange portion being separated by the broken portion, along the entirety thereof or along a part thereof, into an inner portion disposed near the opening portion and an outer portion disposed near a peripheral edge of the flange portion;
a seal film bonded onto an upper surface of the flange portion surrounding the opening portion of the plastic pack container thereby to seal the pack container; and
a peeling film bonded onto lower surfaces of the inner and outer portions of the flange portion in which the broken portion is formed, the peeling film comprising a peeling-start portion extruding outward or inward of the flange portion, wherein by peeling off the peeling film along the flange portion, the broken portion which separates the flange portion into the inner and outer portions can be exposed, and a bonding power of the seal film with the flange portion located outside of the broken portion is larger than a bonding power of the seal film with the flange portion located inside of the broken portion.

2. The easy-open sealed container according to claim 1, wherein a plane shape of the opening portion of the pack container is tetragonal and the flange portion is tetragonal, and the broken portion is formed on two sides, three sides, or four sides of the flange portion, the peeling film bonded onto the lower surface of the flange portion is formed as an integral and one-piece component having substantially the same shape as the shape of the flange portion.

3. The easy-open sealed container according to claim 1, wherein a plane shape of the opening portion of the pack container is tetragonal and the flange portion is tetragonal, and the broken portion is formed on two sides, three sides, or four sides of the flange portion, and the peeling film bonded onto the lower surface of the flange portion is formed by a linear tape which bonds individually to each of the two sides, the three sides, or the four sides of the flange portion.

4. The easy-open sealed container according to claim 1, wherein a plane shape of the opening portion of the pack container is circular or oval, and the broken portion is formed in a part of or in the entire periphery of the circular or oval flange portion, and the peeling film bonded onto the lower surface of the flange portion is formed by an arc-shaped tape, or a circular or oval integral and one-piece component.

5. The easy-open sealed container according to claim 1, wherein the peeling-start portion is defined by a cut disposed at a root of the peeling-start portion to laterally divide the peeling film.

6. The easy-open sealed container according to claim 1, wherein the peeling film includes a pair of long linear films and a pair of short linear films, each pair of the long linear films and the short linear films being arranged in parallel with one another, the long linear films and the short linear films overlapping each other at their respective adjacent ends.

7. The easy-open sealed container according to claim 6, wherein the long linear film and the short linear film have double-sided adhesivity.

8. The easy-open sealed container according to claim 1, wherein the peeling film and the sealing film are separate components from one another.

9. The easy-open sealed container according to claim 1, wherein the peeling film is adhesively bonded onto the lower surfaces of the inner and outer portions of the flange portion.

10. The easy-open sealed container according to claim 1, wherein the peeling film covers and seals the broken portion to prevent separation of the inner and outer flange portions from one another.

11. An easy-open container arrangement comprising:
a container having a wall structure defining an opening;
a flange connected to said wall structure and being disposed in surrounding relation with said opening, said flange defining a perforation in at least part of said flange such that said flange is separable at said part into an outer flange portion disposed adjacent an outer periphery of said flange and an inner flange portion disposed adjacent said opening and between said opening and said outer flange portion, said flange having upper and lower surfaces which face away from one another;

a sealing film bonded to said upper surface of said flange and covering said opening to seal off said container, said sealing film being bonded to both said outer flange portion and said inner flange portion at said upper surface; and a peeling film bonded to both said inner flange portion and said outer flange portion at said lower surface of said flange, whereby removal of said peeling film from said flange exposes said perforation, said sealing film being bonded to said outer flange portion with a bond strength which is greater than a bond strength between said sealing film and said inner flange portion such that said outer flange portion and said sealing film are removed together from said container to open same after removal of said peeling film from said flange.

12. The easy-open sealed container according to claim 11, wherein said peeling film and said sealing film are separate components from one another.

13. The easy-open sealed container according to claim 11, wherein said peeling film is adhesively bonded onto lower surfaces of said inner and outer portions of said flange portion, said lower surfaces of said inner and outer portions of said flange portion together defining said lower surface of said flange portion.

14. The easy-open sealed container according to claim 11, wherein said peeling film covers and seals said perforation to prevent separation of said inner and outer flange portions from one another.

* * * * *